US005619676A

United States Patent [19]
Fukuda et al.

[11] Patent Number: 5,619,676
[45] Date of Patent: Apr. 8, 1997

[54] HIGH SPEED SEMICONDUCTOR MEMORY INCLUDING A CACHE-PREFETCH PREDICTION CONTROLLER INCLUDING A REGISTER FOR STORING PREVIOUS CYCLE REQUESTED ADDRESSES

[75] Inventors: Naoyuki Fukuda, Nara-ken; Yukihiro Yoshida, Ikoma; Noboru Kubo, Yamatokoriyama; Kazuo Kinosita, Tenri, all of Japan

[73] Assignee: Sharp Kabushiki Kaisha, Osaka, Japan

[21] Appl. No.: 675,367

[22] Filed: Jul. 2, 1996

Related U.S. Application Data

[63] Continuation of Ser. No. 205,881, Mar. 3, 1994, abandoned.

[30] Foreign Application Priority Data

Mar. 4, 1993 [JP] Japan ................................ 5-044176
Sep. 2, 1993 [JP] Japan ................................ 5-218918

[51] Int. Cl.⁶ .................................................. G06F 12/02
[52] U.S. Cl. ...................... 395/464; 395/455; 395/421.03
[58] Field of Search ................................ 395/403, 405, 395/440, 444, 445, 450, 452, 455, 464, 421.03, 421.08, 421.09, 421.07, 421.11

[56] References Cited

U.S. PATENT DOCUMENTS

| | | | |
|---|---|---|---|
| 4,490,782 | 12/1984 | Dixon et al. .............................. | 395/425 |
| 4,980,823 | 12/1990 | Liu .......................................... | 395/464 |
| 5,235,697 | 8/1993 | Steely, Jr. et al. ...................... | 395/464 |
| 5,285,527 | 2/1994 | Crick et al. ............................. | 395/425 |
| 5,305,389 | 4/1994 | Palmer .................................... | 395/464 |
| 5,367,656 | 11/1994 | Ryan ....................................... | 395/425 |
| 5,426,764 | 6/1995 | Ryan ....................................... | 395/414 |
| 5,459,834 | 10/1995 | Katayama .............................. | 395/164 |

OTHER PUBLICATIONS

Chisvin, L., et al., "Content-addressable and associative memory: alternatives to the ubiquitous RAM" *IEEE Computer* (Jul. 1989) pp. 51–64.

*Primary Examiner*—Eddie P. Chan
*Assistant Examiner*—Hiep T. Hguyen
*Attorney, Agent, or Firm*—Morrison & Foerster LLP

[57] ABSTRACT

The high speed semiconductor memory includes at least one memory module and a cache controller. The at least one memory module includes a plurality of memory cells for storing data and a cache memory for storing part of the data stored in the plurality of memory cells, The cache controller includes a hit ratio counter for obtaining an average cache hit ratio and a comparator storing a desired threshold hit value and comparing the average cache hit ratio with the desired threshold value. The cache controller determines whether data corresponding to an input address are stored in the cache memory and allows to readout such data from the cache memory, otherwise controlling the read-out of data from the plurality of memory cells for storage in the cache memory so as to update the contents of the cache memory. A request signal for transferring data from the memory cells to the cache memory is generated when the average cache hit ratio is lower than the desired threshold value. The high speed memory further includes a prediction controller for selecting data to be transferred from the memory cells to the cache memory.

6 Claims, 15 Drawing Sheets

OPERATION OF A MULTIPLEXER 370

| HIT | TREQ | 0∅ | 01 | 02 | 03 | 04 |
|---|---|---|---|---|---|---|
| 0 | 0 | i∅ | i∅ | 1 | 0 | 0 |
| 0 | 1 | * | i1 | 1 | 0 | 1 |
| 1 | 0 | i∅ | * | 0 | 1 | 0 |
| 1 | 1 | * | i1 | 0 | 1 | 0 |

* INDICATES "DON'T CARE"

HIGH SPEED SEMICONDUCTOR MEMORY INCLUDING A CACHE-PREFETCH PREDICTION CONTROLLER INCLUDING A REGISTER FOR STORING PREVIOUS CYCLE REQUESTED ADDRESSES

This application is a continuation of application Ser. No. 08/205,881, filed Mar. 3, 1994, now abandoned.

BACKGROUND OF THE INVENTION

1. Field of the Invention

The present invention relates to a high speed memory device which can read out data at a high speed. More particularly it relates to a high speed semiconductor memory and a high speed associative memory both having a cache memory.

2. Description of the Related Art

Various techniques have been developed to attain a high speed semiconductor memory. Examples of such techniques include the following:

(1) A high speed access technique using page mode addressing:

In sense amplifiers each having a latch for storing data, when the sensing operation of the sense amplifiers is finished, for example, n bits of data in the same row addresses are stored in the n sense amplifiers. Then any of the n bits of data can be rapidly selected and output by designating the column address.

According to this page mode technique, a series of storing operations are conducted by first latching the row address internally, and then changing the column address. The first row address is latched in response to the detection of the fall of an RAS signal. In this technique, data is read out by designating a column address through a column line corresponding to the column address, and then another piece of data is read out by designating another column address through another column line corresponding to the column address. During these operations, the row address is fixed.

According to the page mode addressing technique, in a DRAM with the size of, for example, 1024×1K bits (1M bits) having a cycle time of 155 nanoseconds (ns) in the normal mode, when input addresses are in the same row, 1024 of column addresses can be randomly accessed in a cycle time of 50 ns.

(2) A technique utilizing a cache memory:

According to a technique utilizing a cache memory, tags and data are previously stored in a cache memory, and an input address is first compared with the tags in the cache memory. When the input address matches a tag, i.e., when the data corresponding to the input address is found in the cache memory, the data is output from the cache memory. As a result, a high speed data reading is attained.

As a high speed semiconductor memory adopting an improved technique utilizing a cache memory, an RDRAM developed by Rambus, U.S.A., is well known. The RDRAM comprises a slave (RDRAM) portion and a Rambus channel portion. The RDRAM uses the sense amplifier of a DRAM as a cache memory.

In this RDRAM, the size of a page which can be used as a cache memory in a DRAM of, for example, 4M bits is 8K bits. In other words, the RDRAM has a cache memory with two pages per one chip. This is four times as large as the capacity of a sense amplifier used in an ordinary DRAM with four M bits in the page mode. The Rambus channel portion connects the master portion with the RDRAM portion, and nine bits of signals are transferred at a rate of 500M-bytes/second, which is approximately ten times as high speed as in an ordinary DRAM.

In addition to the above-mentioned RDRAM, a synchronous DRAM and a cache DRAM have been reported as a high speed memory.

An associative memory is used to rapidly retrieve data matching a retrieval key word from the data stored in the data storage area. Such an associative memory addresses data depending upon the memory contents, simultaneously distributes the retrieval key word to the data storage areas, compares the key word and the data in parallel using the retrieval key word and a mask, and makes detection and search as a result of collation. Such an associative memory is described in, for example, "Content Addressable and Associate Memory", IEEE Computer, 1989 July, pp. 51–64.

As a conventional architecture for attaining an associative memory, a bit serial system, a byte serial system, a word serial system and a distributed logical memory are known. In the bit serial system, data is registered and retrieved in the storage area bit by bit. In the byte serial system, data is registered and retrieved in the storage area byte by byte. In the word serial system, the size of a logic portion can be smaller than in the distributed logical memory, resulting in a high density of the memory. The bit serial system, the byte serial system and the word serial system are preferred in a large scaled associative memory.

FIG. 15 is a schematic diagram of a conventional associative memory. The associative memory comprises a storage area 801 for storing M data $Word_1$ through $Word_M$ to be retrieved. A retrieval key word is stored in a key word register 802. A mask pattern is stored in a mask register 803.

A plurality of data stored in the storage area 801 are collated with the retrieval key word in a collator 804 connected to the storage area 801 and the mask register 803. The collator 804 is connected to a collation flag register 805 with M bits. Collation flags are written in the collation flag register 805 as a result of the collation. The collation flag register 805 is connected to a flag detection circuit 806 for detecting the collation flags. The associative memory further comprises a retrieval circuit 807 connected to the storage area 801 and an output register 808 connected to the retrieval circuit 807.

The associative memory performs the associative retrieval in the bit serial system as follows: A retrieval key word and a mask pattern are first input to the collator 804 from the key word register 802 and the mask register 803, respectively. Data to be retrieved are input to the storage area 801 and the collator 804. The data to be retrieved herein are M data ($Word_1$ through $Word_M$), and each of the M data is input in parallel to the collator 804 bit by bit.

The collator 804 has M collation circuits respectively corresponding to the respective data. The retrieval key word and the data to be retrieved are input to each collation circuit bit by bit. The collation circuit is designed to output 1 when all the collated bits match and to output 0 when any of the collated bits mismatch. The output of each collation circuit corresponds to each bit of the collation flag register 805. Therefore, a bit in the collation flag register 805 corresponding to the word matching the retrieval key word alone is flagged. To each bit of the collation flag register 805, a register address corresponding to each word of the data is applied.

The collation flag detection circuit 806 outputs a register address signal when all the bits of the collation flag register 805 have a value of 1. The retrieval circuit 807 receives the collated register address, read outs the content in the address in the storage area 801, and outputs the content to the output register 808. The collation in the bit serial system is described in the above, but the collation in the byte serial system and the word serial system can be performed in a similar manner.

The above-mentioned conventional high speed semiconductor memory has the following problems:

In the page mode technique, the access rate is significantly decreased when the input addresses are not in the same row.

In the technique utilizing a cache memory, when the same input address is input a plurality of times, the second and later access can read out data at a high speed. With regard to the first access, however, the data sometimes does not exist in the high speed accessible latch or in the RAM. In such a case, the memory cell array is accessed again, resulting in an operation rate of $1/3$ to $1/5$ as low as the rate in the later access. In order to avoid this, i.e., in order to improve the cache hit ratio, it is necessary to enlarge the memory capacity of the cache memory, resulting in increasing the cost of the semiconductor memory.

Further, when the conventional technique utilizing a cache memory is used to attain a high speed associative memory, the operation rate is limited for the above-mentioned reasons.

SUMMARY OF THE INVENTION

The high speed semiconductor memory of this invention comprises at least one memory module and a cache controller. The memory module includes a plurality of memory cells for storing data and a cache memory for storing part of the data stored in the plurality of memory cells. The cache controller includes a hit ratio counter for obtaining an average cache hit ratio and a comparator for storing a desired threshold value and comparing the threshold value with the average cache hit ratio. The cache controller determines whether or not data corresponding to an input address is stored in the cache memory, allows the data to be output from the cache memory when the data is stored in the cache memory, and allows the data to be read out from the plurality of memory cells to be stored in the cache memory so as to update memory contents of the cache memory. A data transfer request signal is generated for transferring the data from the memory cells to the cache memory when the average cache hit ratio is lower than the threshold value.

The high speed associative memory of this invention comprises at least one memory module including a plurality of memory cells for storing data and a cache memory for storing part of the data stored in the plurality of memory cells; collating means for collating input data and an input mask pattern with the stored data; a cache controller for determining whether or not data matching the input data are stored in the cache memory, and when the data is not stored in the cache memory, allowing the data to be read out from the plurality of memory cells to be stored in the cache memory so as to update memory contents of the cache memory; and a hit ratio counter for obtaining an average cache hit ratio. The hit ratio counter includes a comparator for storing a desired threshold value and comparing the threshold value with the average cache hit ratio. A data transfer request signal for transferring the data from the memory cells to the cache memory is generated when the average cache hit ratio is lower than the threshold value.

Thus, the invention described herein makes possible the advantage of providing an inexpensive high speed semiconductor memory and an inexpensive high speed associative memory with an improved cache hit ratio by taking advantage of a cache memory.

In the high speed semiconductor memory comprising a cache memory according to the present invention, a cache controller first determines whether or not data corresponding to an input address is stored in the cache memory. When the data is not stored in the cache memory, the data is read out from a memory cell array. When the data is stored in the cache memory, the data is read out from the cache memory. Thus, data is rapidly read out at the time of cache hit.

In the high speed semiconductor memory of the present invention, an average cache hit ratio is obtained by a hit ratio counter. When the average cache hit ratio is lower than a desired threshold value, a data transfer request signal for transferring data from the memory cell array to the cache memory is sent by the cache controller. When a prediction controller receives the data transfer request signal, the prediction controller selects the first address of the data to be transferred from the memory cell array to the cache memory. The data in a series of addresses starting from the selected first address is transferred to the cache memory. The data is predictively selected so as to improve the subsequent cache hit ratio. In this manner, the contents of the cache memory are predictively updated in the present invention, and therefore, the number of miss hits in the cache memory can be decreased.

When the prediction controller has a shift register for storing the input addresses in the past several cycles, the first address of the data to be transferred from the memory cell array to the cache memory can be decided based upon previously settled address modification equations and the input addresses in the past several cycles.

Moreover, in the high speed associative memory having a cache memory of the present invention, a cache controller first determines whether or not the data corresponding to an input data (hereinafter referred to as the "associative contents") are stored in the cache memory. When the associative contents are not stored in the cache memory, the associative contents are read out from a memory cell array. When they are stored in the cache memory, they are read out from the cache memory. Thus, data can be rapidly read out at the time of a cache hit.

In the high speed associative memory of the present invention, an average cache hit ratio is obtained by a hit ratio counter. When the average cache hit ratio is lower than a desired threshold value, a data transfer request signal for transferring data from the memory cell array to the cache memory is sent from the hit ratio counter to a prediction controller. When the prediction controller receives the data transfer request signal, the prediction controller decides which data is to be transferred from the memory cell array to the cache memory, and a series of data associated with the data are transferred to the cache memory. The data are predictively selected so as to improve the subsequent cache hit ratio. In this manner, the contents in the cache memory are predictively updated in the present invention, and therefore, miss hits in the cache memory can be decreased.

When the prediction controller has a shift register for storing the input data in the past several cycles, the data to be transferred from the memory cell array to the cache memory can be decided based upon previously settled data pattern prediction equations and the input data in the past several cycles.

These and other advantages of the present invention will become apparent to those skilled in the art upon reading and understanding the following detailed description with reference to the accompanying figures.

DESCRIPTION OF THE PREFERRED EMBODIMENTS

The present invention will now be described by way of examples.

(EXAMPLE 1)

Figure 1:
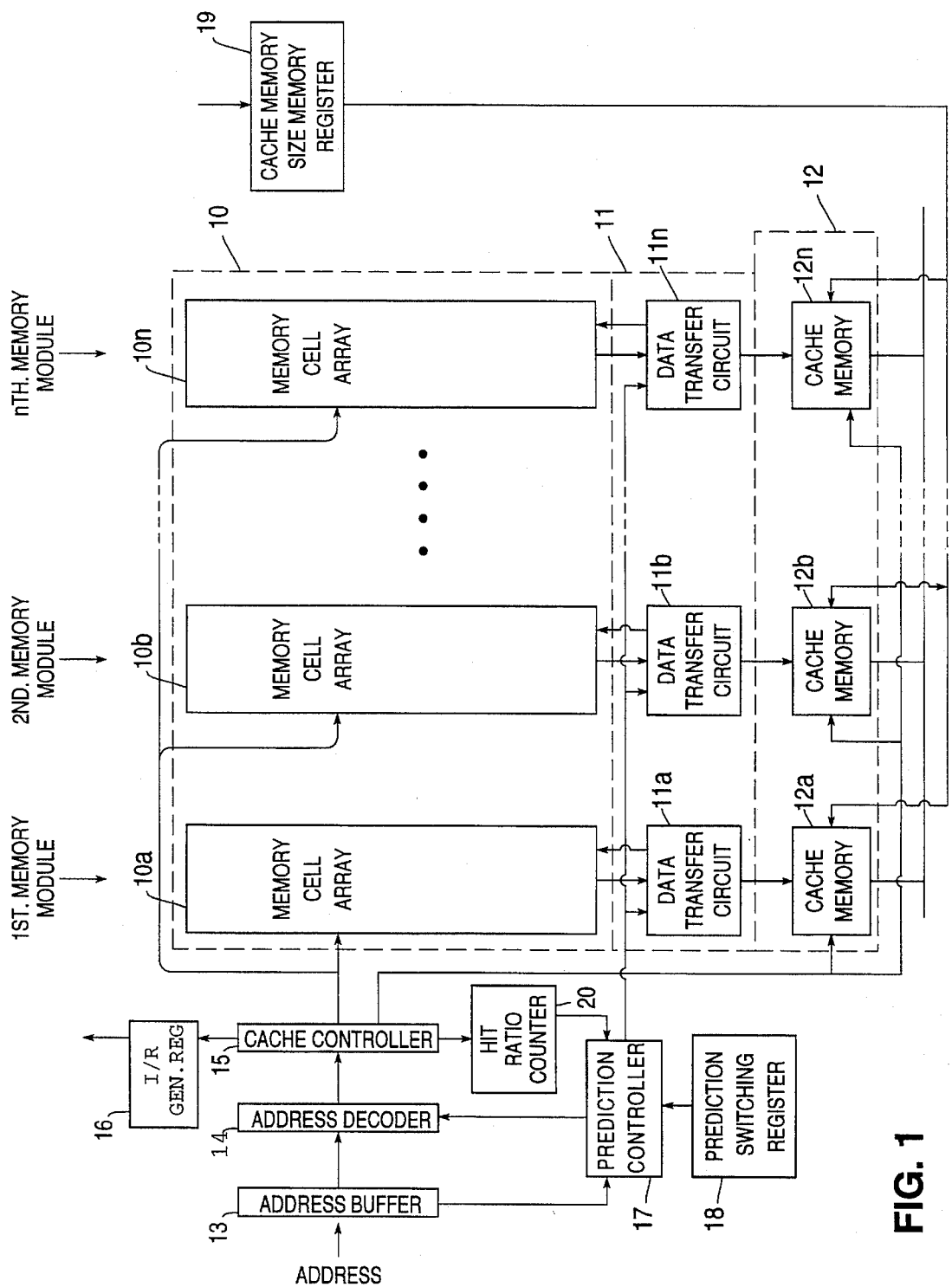
FIG. 1 is a schematic diagram of a high speed semiconductor memory of the present invention.

Referring to FIG. 1, the structure of the high speed semiconductor memory of this example will be described. The high speed semiconductor memory comprises N memory modules. The leftmost memory module in FIG. 1 is herein referred to as the 1st memory module, and the ith memory module from the left one is referred to as the ith memory module. Each memory module comprises ordinary memory cell arrays 10 for storing data, memory cell arrays 10a, 10b and 10n of memory arrays 10 are shown in FIG. 1, cache memories 12 for storing part of the data in the memory cell arrays 10, cache memories 12a, 12b and 12n of cache memories 12 are shown in FIG. 1, and a data transfer circuit arrangement 11 for transferring data from the memory cell arrays 10 to the cache memories 12 transfer circuits 11a, 11b, and 11n of transfer circuit arrangement 12 are shown in FIG. 1. Such a basic structure is identical to that of a conventional semiconductor memory. Each memory cell in the memory cell arrays 10 can be a ROM or a RAM.

In FIG. 1, only three memory modules are shown for simplification, and the number of the memory modules used in the semiconductor memory of this example is 16 (N=16). The memory capacity of each memory cell array 10a through 10m is 1M bit. Therefore, the total memory capacity of the semiconductor memory is 16M bits. The memory of cache memories capacity of each cache memory 12 is 1K bit. When data is read out byte by byte, the size of an address space needs $2^{17}$. The values are not limited to those described herein, but can be optionally settled.

An address signal input to the semiconductor memory through an address bus line (hereinafter referred to as the "input address A") is transferred to each memory module through an address buffer 13, an address decoder 14 and a cache controller 15. The input address A is decoded by the address decoder 14. The data read out from the memory module is output through an output buffer (not shown). The semiconductor memory is identical to a conventional semiconductor memory at these points.

The structure and the function of the cache controller 15 will now be described in detail.

As is shown in FIG. 1, the cache controller 15 is connected in parallel with the memory cell arrays 10 and the cache memories 12. The cache controller 15 has a function to determine whether or not the input address A having been decoded by the address decoder 14 is located in the cache memories 12. In other words, the cache controller 15 determines whether or not the data corresponding to the input address A is stored in the cache memories 12. When the data is stored in the cache memories 12 (i.e., at the time of cache hit), the data is output from the cache memories 12. At this point, the data read out time becomes shorter than that from the memory cell arrays 10.

Figure 2:
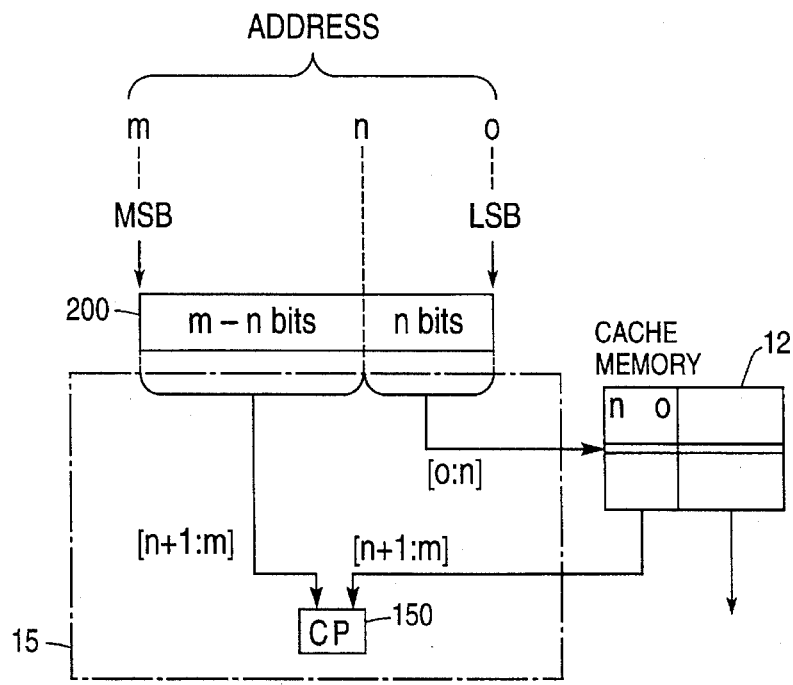
FIG. 2 is a schematic diagram of a cache controller used in the high speed semiconductor memory of the present invention.

The processing circuit of cache hit judgment by the cache controller 15 will now be described referring to FIG. 2. When the input address A is input to an address register 200, tag addresses of tag memories in the cache memories 12 are retrieved for n bits from the LSB (least significant bit) to the nth bit of the input address A. When tag addresses matching the n bits of the input address A are found, the data corresponding to the tag addresses are output. A comparator 150 in the cache memory 15 compares the tag address with m−n bits from the (n+1)th bit to the MSB (most significant bit; the mth bit) of the input address A. When they match (i.e., at cache hit), the corresponding data is output from the cache memories 12. When they mismatch (i.e., at cache miss hit), the data is read out from any of the memory cell arrays 10, and by using the input address A and the data read out from the memory cell arrays 10, the tag memory and the data memories of the cache memory 12 are updated.

When cache hits, data can be read out at a short time of, for example, 20 ns. At miss hit, data is read out in short time of approximately 150 ns. In this example, the data contents in the cache memories 12 are updated not only at miss hit but also when the cache hit ratio is decreased, thereby improving the cache hit ratio.

The semiconductor memory of this example has the following structure for updating data:

The cache controller 15 has a hit ratio counter 20 for obtaining an average cache hit ratio. The average cache hit ratio is an average of ratios at which the data corresponding to an input address A are found in the cache memories 12 in the past several cycles. The hit ratio counter 20 has a register with $\tau$ bits, and stores the number of cache hits in the past $\tau$ cycles, upon which it calculates an average cache hit ratio.

Further, the cache controller 15 comprises a comparator for comparing an average cache hit ratio with a desired threshold value H. When the average cache hit ratio is lower than the threshold value H, it generates a data transfer request signal for transferring data from the memory cell array 10 to the cache memories 12. The data transfer request signal is sent to a prediction controller 17 described below. The threshold value H can be optionally settled at, for example, 85% or 90%.

The semiconductor memory of this example further comprises the prediction controller 17 as mentioned above. The structure and the function of the prediction controller 17 will now be described referring to FIG. 3.

When the prediction controller 17 receives a data transfer request signal from the cache controller 15, the prediction controller 17 can determine the first address of a block of data to be transferred from the memory cell arrays 10 to the cache memories 12. The subsequent cache hit ratio can be increased by appropriately predicting and selecting a block of data to be transferred from the memory cell arrays 10 to the cache memories 12.

Figure 3:
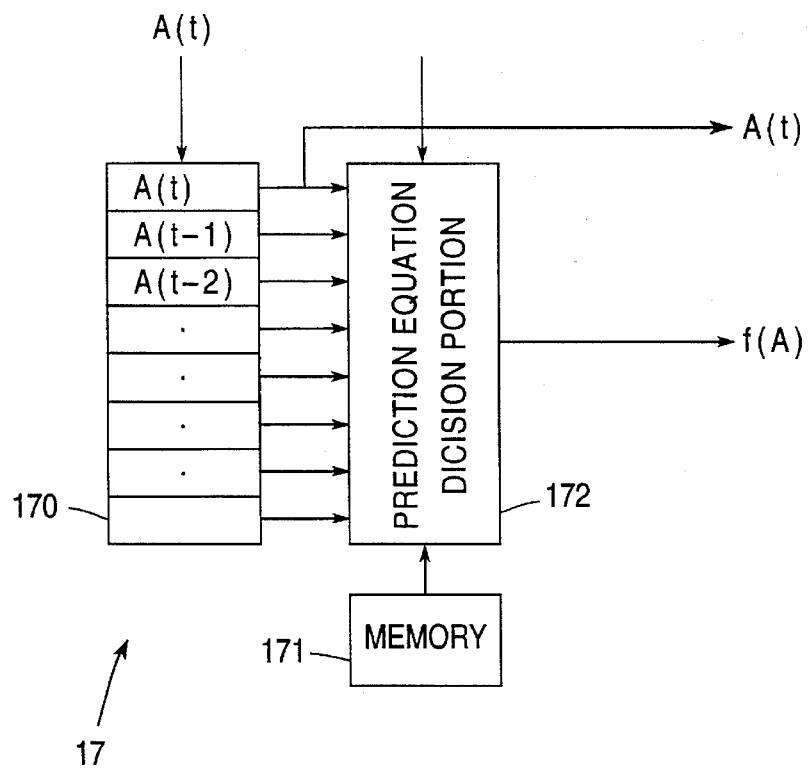
FIG. 3 is a schematic diagram of a prediction controller used in the high speed semiconductor memory of the present invention.

The prediction controller 17 receives an input address A through the address buffer 13, and can store it. The prediction controller 17 comprises a shift register 170 for storing the input address A as shown in FIG. 3. In the shift register 170, the input addresses A in the past several cycles (for example, P cycles) can be stored. The input address A at a certain cycle (time t) is herein referred to as the input address $A(t)$. The input address A in a cycle prior to the time t by n cycle(s) is herein referred to as the input address $A(t-n)$. In this representation, the shift register 170 can store P input addresses A, i.e., the input addresses $A(t)$ through $A(t-P+1)$. Each input address A stored in the shift register 170 can be sent to a prediction equation decision portion 172 in parallel.

The prediction controller 17 predicts the first address $f(A)$ of a block of data to be transferred from the memory cell arrays 10 to the cache memories 12 in the prediction equation decision portion 172 based on address modification prediction equations previously stored in a prediction equation memory 171. In other words, a block of data corresponding to a series of addresses successively following the first address $f(A)$ predicted by the prediction controller 17 is transferred from the memory cell arrays 10 to the cache memories 12 (block transfer). The size of the data to be block-transferred is 1024/N bits. Here N means the number of memory modules The address modification prediction equation can be settled as a function of input addresses A in the past several cycles. Examples of the address modification prediction equations are shown below as Equations 1 through 8. In the following equations, the first address $f(A)$ is shown as a function of the past addresses A. The prediction controller 17 predicts the first address $f(A)$ by applying a desired number of addresses among the input addresses $A(t)$ through $A(t-P+1)$ stored in the shift register to any of the address modification prediction equations.

Equation 1:

If $\{A(t)>A(t-1)\}$ and $\{A(t-1)>A(t-2)\}$ then $f(A)=A(t)+\{A(t)-A(t-1)\}$

Equation 2:

If $\{A(t)<A(t-1)\}$ and $\{A(t-1)<A(t-2)\}$ then $f(A)=A(t)+\{A(t)-A(t-1)\}-K+1$, $K=1024/N$, wherein K is the size of data to be transferred.

Equation 3:

$f(A)=A(t)+1$

Equation 4:

$f(A)=A(t)-1$

Equation 5:

$f(A)=A(t)+R$, wherein R is a constant larger than 1.

Equation 6:

$f(A)=A(t)-R$, wherein R is a constant larger than 1.

Equation 7:

$f(A)=A_{min}$, wherein $A_{min}$ is the minimum address in the memory cell array.

Equation 8:

$f(A)=A_{max}$, wherein $A_{max}$ is the maximal address in the memory cell array.

If a cache hit ratio is not increased by adopting one equation, another equation can be selected instead. The prediction controller 17 is connected to a prediction switching register 18, which can switch the equation to be used among the stored prediction equations.

In this manner, in the semiconductor memory of this example, the sequential addresses following the first address $f(A)$ and the data corresponding to the addresses are block-transferred from the memory cell array 10 to the cache memory 12. When data corresponding to the input address A is not found in the cache memory 12, an interrupt-request generation register 16 (shown in FIG. 1) outputs an interrupt-request signal, thereby immediately transferring the data to the cache memory 12 from the memory cell array 10. The interrupt-request signal is kept on being output until the transfer is over.

The high speed semiconductor memory of this example further comprises a cache memory size setting register 19 as shown in FIG. 1. The cache memory size setting register 19 determines the size of the memory capacity and the number of banks of the cache memory 12. For example, the cache memory 12 can be used as a memory with one bank of 1K bits by setting the cache memory size setting register 19 at 1. Alternatively, by setting the cache memory size setting register 19 at 2, the cache memory 12 can be used as a memory with two banks of 512 bits each.

The specific operation of the prediction controller 17 will now be described in detail.

In the following description, each memory cell array 10 has a size of 64K×16 bits (1M bits) and each cache memory 12 has a size of 64×16 bits (1K bits). Since the semiconductor memory has sixteen memory modules, the total capacity of the semiconductor memory is 1M×16 bits (16M bits).

An address A(t) has $2^{20}$ address spaces represented from 00000h to FFFFFh (Hexadecimal). The cache memory 12 is settled to have four banks by using the cache memory size setting register 19, and the number of words of the data to be transferred from the memory cell 10 to the cache memory 12 (the number of the transferred words) is 16 words. The shift register 170 of the prediction controller 17 can store four words, it is assumed that the threshold value for the cache hit ratio is set at 90%, and input addresses in five cycles are used to obtain an average cache hit ratio.

For example, the following addresses are assumed to be stored as the input addresses in the past five cycles from the t=T−4 cycle to the t=T cycle:

t=T−4: A(t)=00010h t=T−3: A(t)=00011b t=T−2: A(t)=00012h t=T−1: A(t)=00013h t=T: A(t)=00014h

Further, it is assumed that the average cache hit ratio is lower than the threshold value, i.e., less than 90%, at the time t=T. At this point, a data transfer request signal is sent from the hit ratio counter 20 to the prediction controller 17. The prediction controller 17, having received the data transfer request signal, obtains the first address f1(A)=00015h calculated; from Equation 1 according to the prediction switching register 18. Then, the prediction controller 17 transfers 16 words of data following the first address 00015h from the memory cell array 10 to the cache memory 12.

As mentioned above, the cache memory 12 is divided into four banks each having 16 words. The data transferred from the memory cell array 10 are preferably written in a bank which has been read out most recently among the four banks. At the same time of writing the data, the corresponding tag memories are updated.

Figure 4:
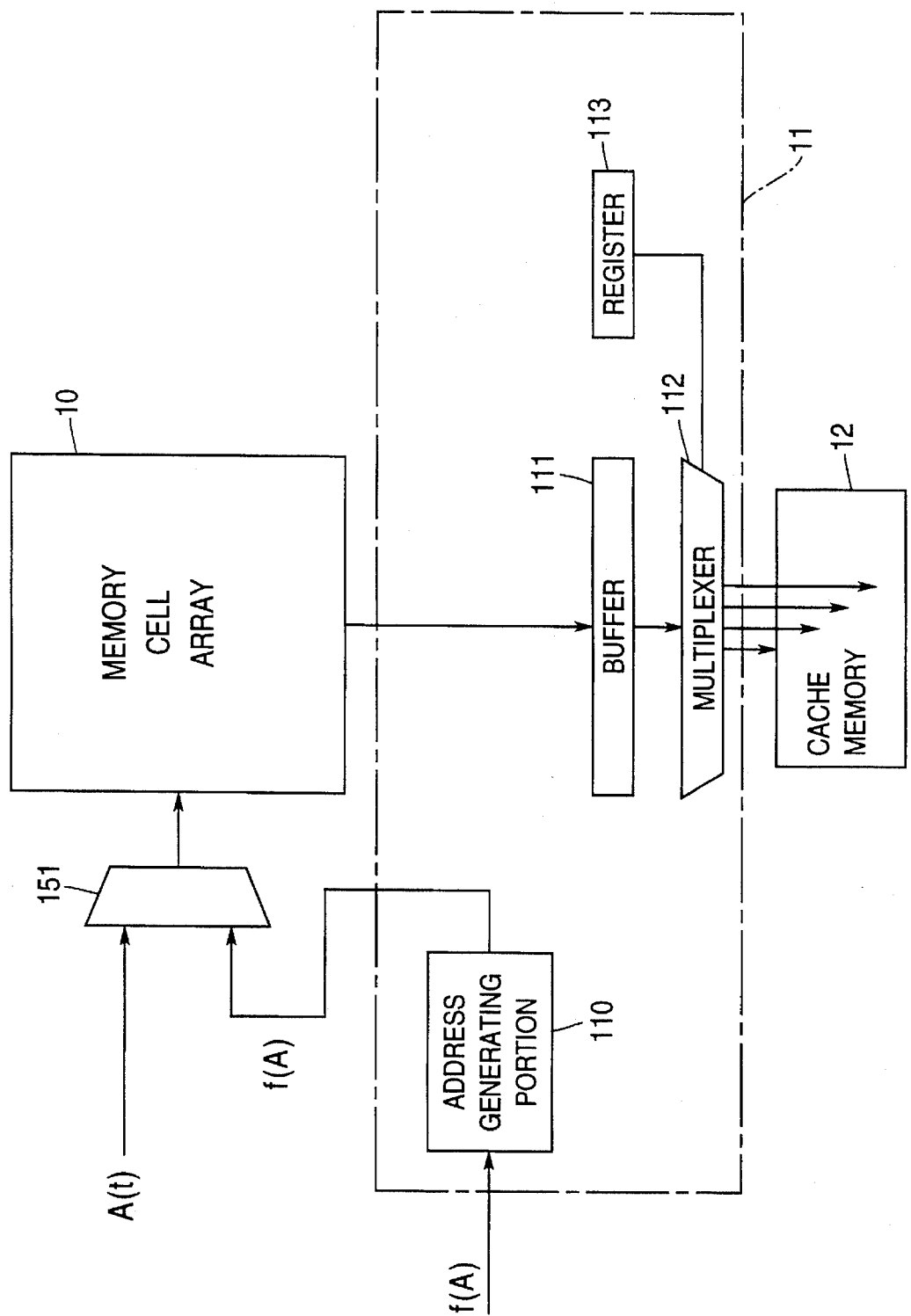
FIG. 4 is a schematic diagram of a data transfer circuit used in the high speed semiconductor memory of the present invention.

A cyclic order for the banks in the cache memory 12 is useful to determine which bank has been read out most recently. FIG. 4 shows an example of the structure of the data transfer circuit 11 for performing the cyclic order in the cache memory 12 with four banks each having 16 words. The data transfer circuit 11 has an address generating portion 110 for receiving the first address f(A) from the prediction controller 17. The address generating portion 110 outputs the addresses of the data to be transferred. The output from the address generating portion 110 is input to a multiplexer 151. When the prediction controller 17 transfers the data, the multiplexer 151 selects the first address f(A), and at the time of cache miss hit, the multiplexer 151 selects the input address A(t).

The data read out from the memory cell array 10 is transferred to the cache memory 12 through a buffer 111 and a multiplexer 112. The data transfer circuit 11 further comprises a bank mode register 113 for specifying a bank in which the data is to be written.

In the data transfer, the data is transferred to the buffer 111 word by word from the first address. The data in the buffer 111 is written in a bank specified by the bank mode register 113 among the four banks of the cache memory 12. When the capacity of the buffer 111 is 1 word, 16 cycles are required to transfer 16 words of data. When the 16 words of data are transferred to the bank in the cache memory 12, the memory content of the bank mode register 113 is incremented by 1, thereby specifying the next bank. The cyclic ordering is thus processed.

The time required for data transfer in a memory cell is as follows: According to Computational Ram: A memory-SIMD Hybrid and its Application to DSP (CICC May 6, 1992 section 30.6), a data transfer rate in a memory is $1.1 \times 10^{12}$ byte/second in general. Therefore, the time required for the block transfer of the 16 words of data (1 word=16 bits) is $(1.6 \times 16)/(1.1 \times 10^{12} \times 8) = 2.9 \times 10^{-11}$ seconds. This transfer time is sufficiently smaller than the read out time of an SRAM used as the cache memory. The read out time of the memory is not affected by the calculation of the cache hit ratio because the cache hit ratio is calculated in parallel with the access to the memory.

The time required for the selection and calculation of the prediction equation depends upon the prediction equation to be selected. Among the above-mentioned Equations, Equation 2 takes the longest time because four additions/subtractions processes are required in this equation. Since one process of an eight bit full adder fabricated by a 0.8 μm design rule generally takes approximately 2 ns, the calculation by Equation 2 takes approximately 8 ns (i.e. 2 ns×4 times). This is still shorter than the read out time of the cache memory.

As described above, in the high speed semiconductor memory of this example, it is possible to make the memory capacity of the cache memory significantly smaller than that of the memory cell array, resulting in a compact high speed semiconductor memory. More specifically, the ratio of the memory capacity of the memory cell array 10 to that of the cache memory 12 is 1000:1 in the semiconductor memory of this example, whereas the ratio is 250:1 in a conventional RDRAM technique.

Figure 5:
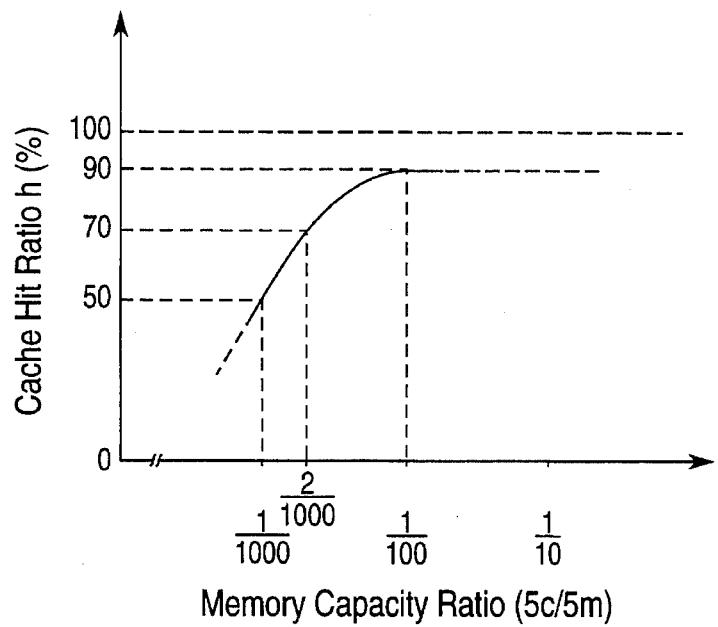
FIG. 5 is a graph which shows the relationship between the capacity ratio of a memory cell array to a cache memory (Sc/Sm) and a cache hit ratio (h)

The relationship between the capacity ratio of the cache memory and the hit ratio varies depending upon the application. Generally, a larger size of the cache memory improves the performance of the semiconductor memory. However, when the memory capacity of the cache memory is too large, the access to the cache memory becomes a critical path, thereby decreasing the read out time. FIG. 5 shows the relationship between the capacity ratio of the memory cell array to the cache memory and the cache hit ratio. In FIG. 5, h denotes the cache hit ratio, Sm denotes the memory capacity of the memory cell array and Sc denotes the memory capacity of the cache memory.

Owing to the above described predicting and updating function, the high speed semiconductor memory of this example can decrease the miss hits to improve the cache hit ratio. This will now be described in more detail by using specific values. The relationship between the cache hit ratio and the read out time is generally represented by the following equation:

$$tr = tc \cdot h/100 + (tm + tc) \cdot (1 - h/100) + tp$$

wherein tr indicates the read out time of the semiconductor memory, tc indicates the read out time of the cache memory, tm indicates the read out time of the memory cell, h indicates the cache hit ratio by percentage, and tp indicates the time required for the calculation of the first address of data to be block-transferred based on the past input addresses and the prediction equation.

Figure 6:
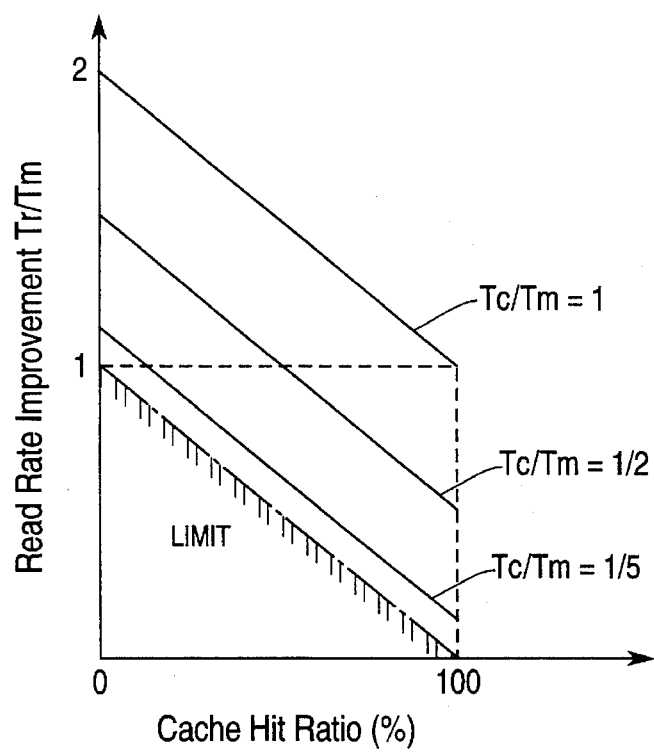
FIG. 6 is a graph which shows the relationship between the cache hit ratio (h) and a read out time improvement (tr/tm).
Figure 7:
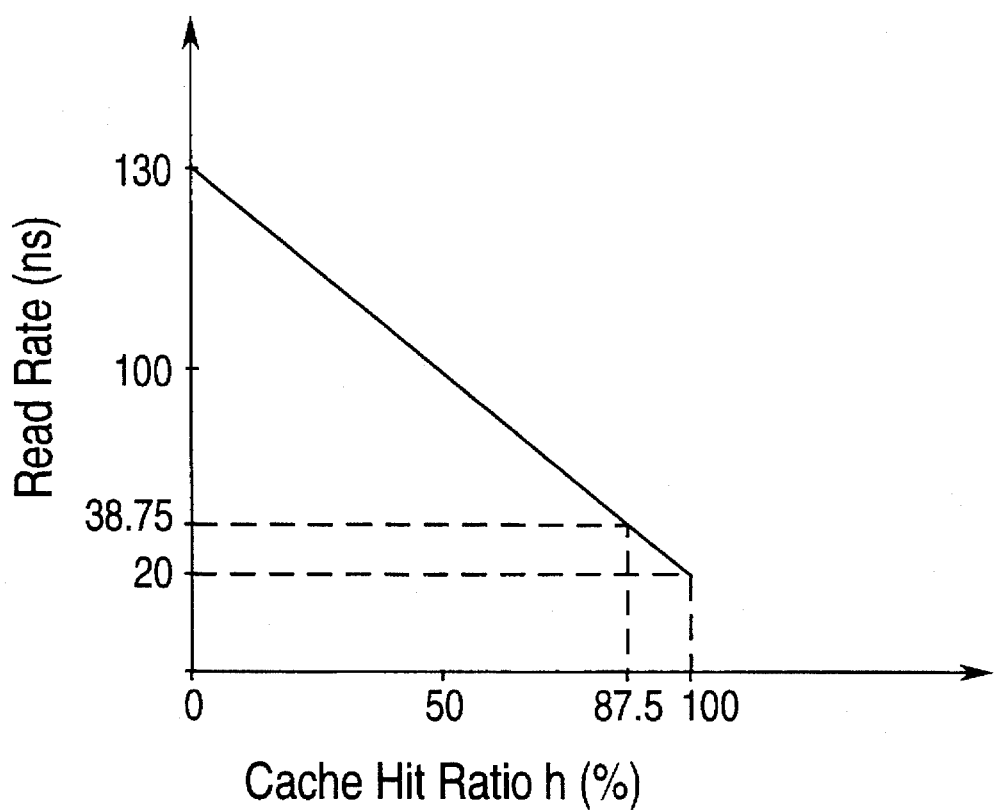
FIG. 7 is a graph which shows the relationship between the cache hit ratio (h) and a data read out time (tr).

FIG. 6 shows the relationship between the cache hit ratio and the read out time improvement. The read out time improvement is represented by tr/tm. The read out time will be described more specifically with regard to a case where, for example, tc is 20 ns, tm is 150 ns, and tp is approximately 0 seconds. When it is assumed that all the input addresses are once accessed, the cache hit ratio h is 0 in a conventional cache memory type high speed semiconductor memory. Therefore, tr in this case is 150 ns from the above-mentioned equation. This is equal to the read out time required to access the memory cell array 10. In the high speed semiconductor memory of this example, even when one piece of data is accessed only once, the contents of the cache memory 12 are updated by the data transfer based on the prediction equation. As a result, for example, in a case where 16 bytes of data are transferred using the data in the past four cycles to calculate the average cache hit ratio and the prediction equation, when a miss hit occurs twice in one data transfer, the miss hit ratio is 100/8=12.5%. Therefore, the hit ratio is 87.5%. FIG. 7 shows the relationship between the cache hit ratio and the read out time. The X axis indicates the cache hit ratio h, and the Y axis indicates the read out time of the semiconductor memory of this invention including the cache memory with a read out time of 20 ns. In FIG. 7, the data in a case where tm is 150 ns is plotted. As is known from FIG. 7, when the hit ratio h is 87.5%, tr is 38.75 ns. This is 3.9 times as short as the read out time required to access the memory cell array 10. The overhead of the calculation of the prediction equation and the data transfer based on the calculation is significantly smaller than the read out time of the cache memory as described above.

The relationship among the size of the cache memory, the access pattern to the semiconductor memory and the hit ratio will now be described. The relationship described below was obtained through simulation performed by the present inventors.

Figure 16:
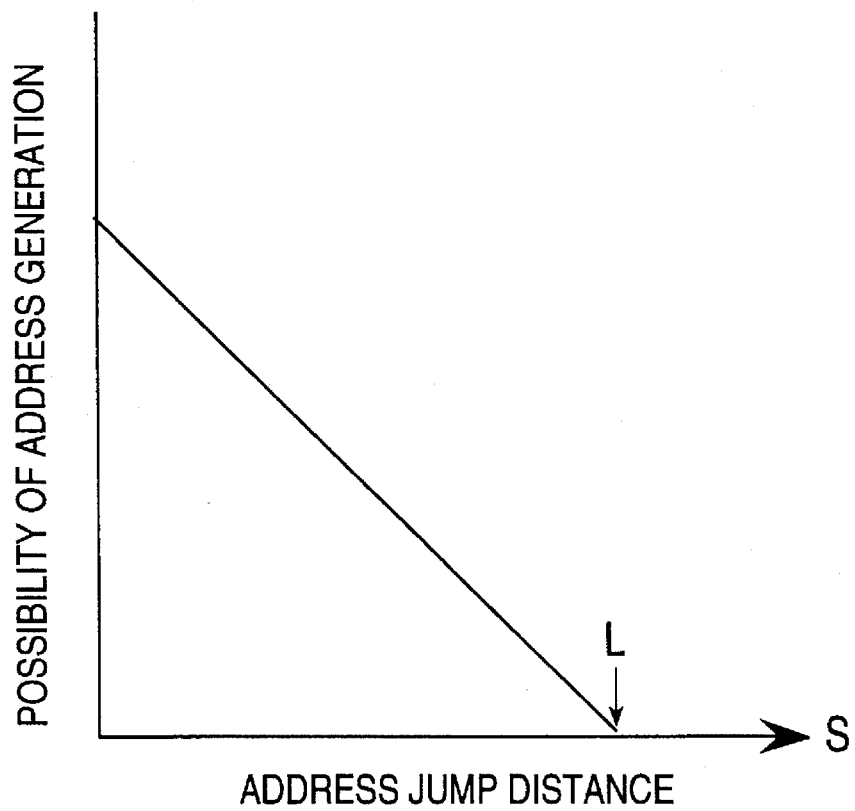
FIG. 16 shows an address pattern used in an operation simulation of a high speed semiconductor memory.

First, the access pattern I used in the simulation is as follows: When the address to be accessed at present is taken as the address A(t), the possibility of generation of the next address A(t+1) is linearly distributed against the difference between the addresses, i.e., A(t+1)−A(t). The difference A(t+1)−A(t) is herein referred to as an address jump distance S. In FIG. 16, the abscissa indicates the address jump distance S and the ordinate indicates the possibility of the generation of the next address A(t+1). In this access pattern I, as the address jump distance S becomes large, the generation possibility becomes linearly small. The address jump distance S at which the generation possibility of the address A(t+1) is 0 is designated as an address shift, which is shown with L (unit: word) in FIG. 16. The term "address shift L" is used in a context such as "the address shift L is 256 words". As the address shift L becomes large, the generation possibility of the address A(t+1) having a larger address jump distance S becomes high.

Next, the update algorithm of the cache memory will be described.

The read out algorithm is as follows:

Step 0: An address A(t) is input.

Step 1: In the case of a miss hit of the address A(t) in the cache memory, appropriate data is eliminated from the cache memory to secure a space area. Then, a block of data starting from data D(t) corresponding to the address A(t) is read out from the memory cell array to the cache memory.

Step 2: The data D(t) is read out from the cache memory to be output.

Step 3: When the hit ratio becomes smaller than a previously settled threshold value, an address A(t+1) is predicted. When the predicted address A(t+1) is not present in the cache memory, appropriate data is eliminated from the cache memory to secure a space area. Then, a block of data starting from data D(t+1) corresponding to the address A(t+1) is read out from the memory cell array to the cache memory. In the simulation, Equation 1 was used in view of the used access pattern I.

In the simulation, the cache memory was updated block by block. When the size of a block is taken as B, L/B denotes non-locality of access.

Figure 17:
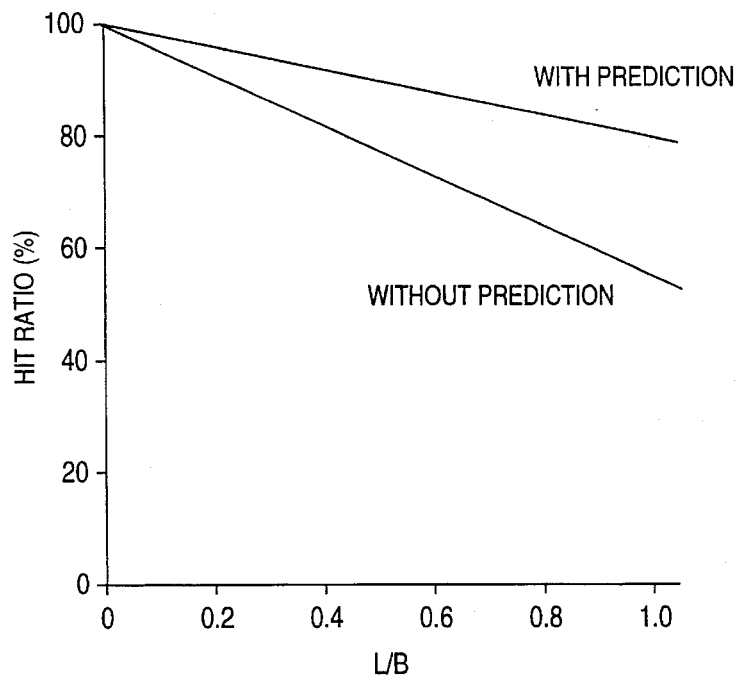
FIG. 17 is a graph showing the results of the operation simulation of the high speed semiconductor memory.
Figure 18:
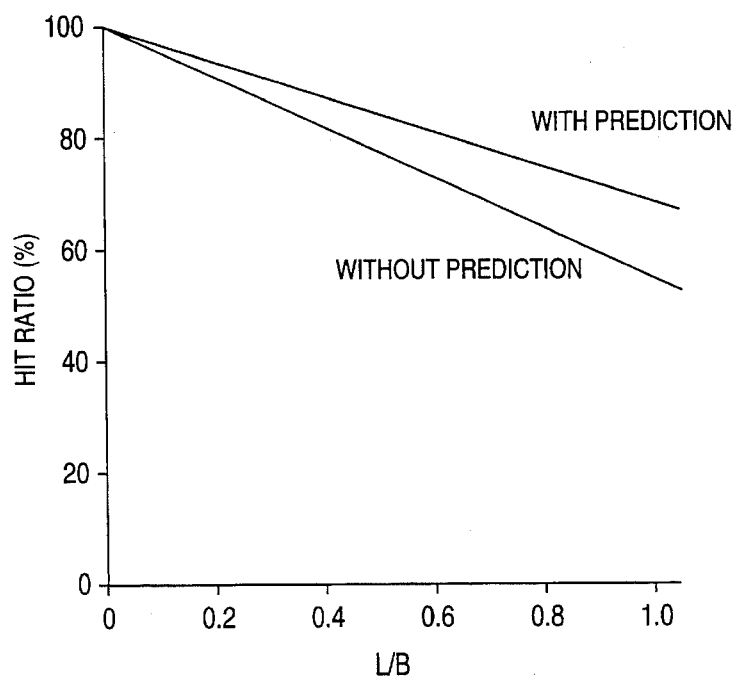
FIG. 18 is a graph showing the other results of the operation simulation of the high speed semiconductor memory.

FIGS. 17 and 18 show the results of the simulation performed under the above-mentioned conditions. FIG. 17 shows the difference in the hit ratio owing to the presence of the prediction of the transfer address at the time of a miss hit in a cache memory having one block. FIG. 18 shows the same in a cache memory with two blocks. The memory capacity of the semiconductor memory is 1M words, and the memory capacities of the cache memories are 512 words (FIG. 17) and 1K words (FIG. 18), and the size of the block is 512 words. In the simulation, addresses were generated one thousand times.

The results of the simulation reveal the following:

(1) The hit ratio is decreased in proportion to the non-locality (L/B) of the access.

(2) The hit ratio is significantly improved by the prediction algorithm.

(3) When the cache memory has two or more blocks, the hit ratio is improved more effectively than in a cache memory having only one block.

According to the present invention, the semiconductor memory can be operated in at least the following two modes:

(1) Vertical mode:

Sequential addressing is conducted in the memory cell array 10 in the first memory module, and is followed by sequential addressing in the memory cell array 10 in the second memory module. The data in the addresses starting from the first address can be transferred block by block to each cache memory 12 from each memory cell array 10 (block transfer). At this point, the data is transferred to each of the sixteen cache memories 12 independently. For example, while the cache memory 12 in the first memory module is accessed, the data is transferred based on the prediction equation to the cache memory 12 in the second memory module.

(2) Horizontal mode:

Addressing of the first row of the memory cell array 10 in the first memory module is followed by addressing of the first row of the memory cell array 10 in the second memory module. Addressing of the first row of the memory cell array 10 in the Nth memory module is followed by addressing of the second row of the memory cell array 10 in the first memory module.

At this point, 16 bytes of data in the addresses starting from the first address are transferred from any of the memory cell arrays 10 to the corresponding cache memories 12. For example, it is assumed that the first address f(A)= 00010h is present in the cache memory 12 in the first memory module, and that 256 words (i.e., 16×16 words) of data in the addresses starting from the first address f(A) are transferred to all the cache memories 12. In such a case, the data in the addresses 00011h, 00021h, ..., and 000F1h are written in a specified bank in the cache memory 12 in the first memory module. The data in the addresses 0001Fh, 0002Fh, ..., and 000FFh are written in a specified bank in the cache memory 12 in the Nth memory module. As a result, continuous addresses are assigned to each cache memory 12 from the first memory module to the Nth memory module.

In the horizontal mode, the data transfer in the sixteen memory modules is performed in parallel. In other words, by incrementing the transfer address by 16 from the first address in each memory module, sixteen data transfers can be performed in parallel (parallel data transfer).

(EXAMPLE 2)

The high speed associative memory of this example will now be described referring to FIG. 8.

The high speed associative memory comprises M memory modules $2100_1$ through $2100_m$. In FIG. 8 two modules $2100_1$ and $2100_m$ of memory modules $2100_1$ through $2100_m$ are shown. Each memory module comprises an ordinary memory cell array 210 for storing data, a cache memory 214 for storing part of the data stored in the memory cell array 210, and a data transfer circuit 212 for transferring data from the memory cell array 210 to the cache memory 214. Each memory module further comprises a collator 211 and a cache memory collator 213 for collating input data with the stored data. Each one of the memory cell in the memory cell array 210 can be a ROM cell or a RAM cell. The leftmost memory module, in FIG. 8 is referred to as the 1st memory module, and the ith memory module from the left is referred to as the ith memory module ($1 \leq i \leq M$). The Jth data stored in the memory cell array 210 and the cache memory 214 in the ith memory module is indicated as Word(i, j) ($1 \leq j \leq N$).

Figure 8:
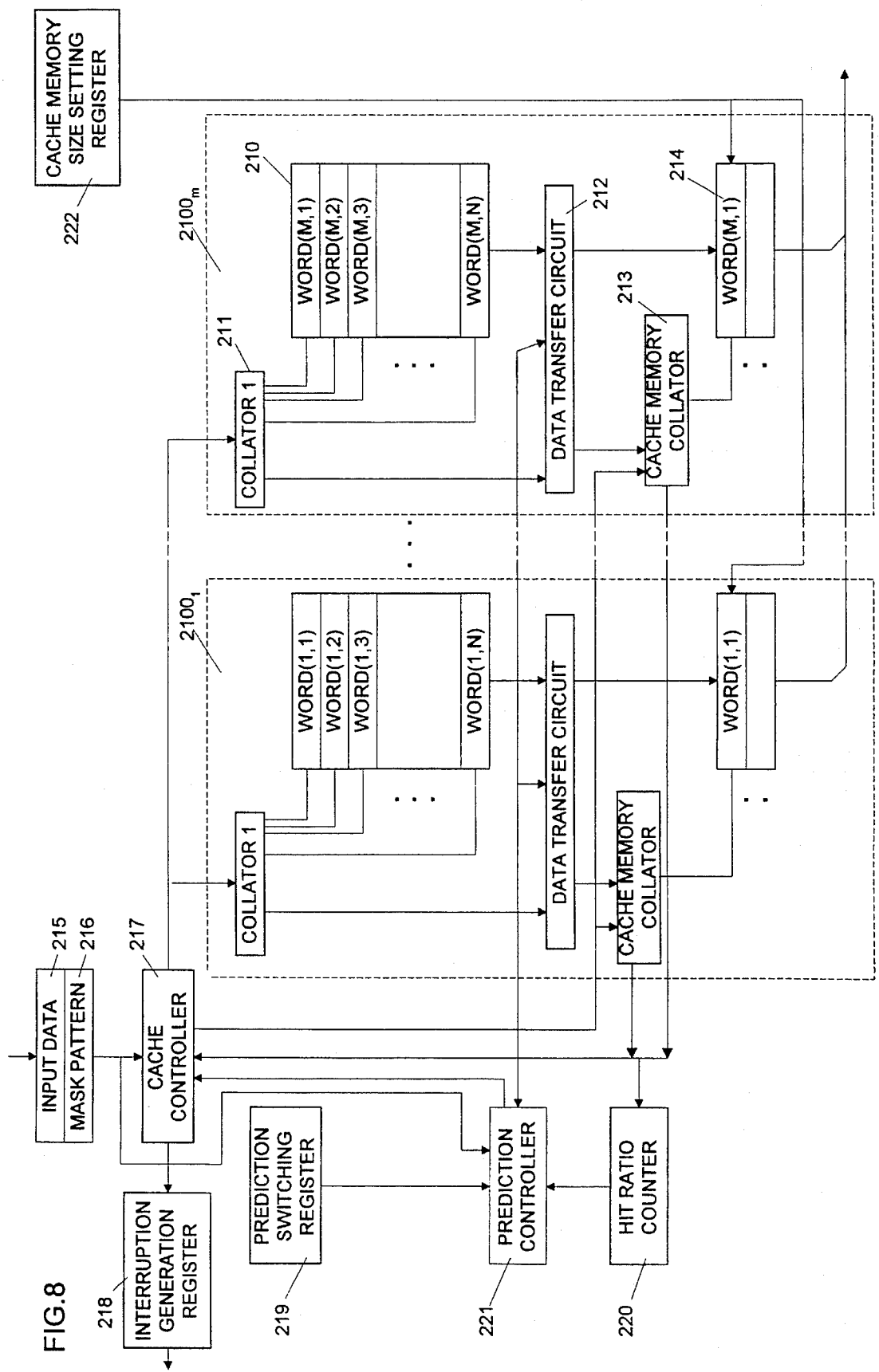
FIG. 8 is a schematic diagram of a high speed associative memory of the present invention.

Although only two memory modules are shown in FIG. 8 for simplification, the associative memory of this example actually has sixteen memory modules (M=16). The memory capacity of each memory cell array 210 (the memory bit count) is 1M bit, and therefore, the total memory capacity of the associative memory is 16M bits. The memory capacity of each cache memory 214 is 1K bit. When data is read out byte by byte, the size of the address space is $2^{17}$. The values are not limited to those described herein, but can be optionally settled.

Data 215 to be input to the high speed associative memory (hereinafter occasionally referred to as the "input data CD") and a mask pattern 216 (hereinafter occasionally referred to as the "mask pattern MD") are transferred to the collator 211 or the cache memory collator 213 in each memory module through a cache controller 217. The input data 215 herein corresponds to a key word and the like for a word search. In this example, the bit widths of the input data CD and the mask pattern MD are m bits and m−1 bits, respectively. The data read out from a memory module are output through an output buffer (not shown).

Figure 9:
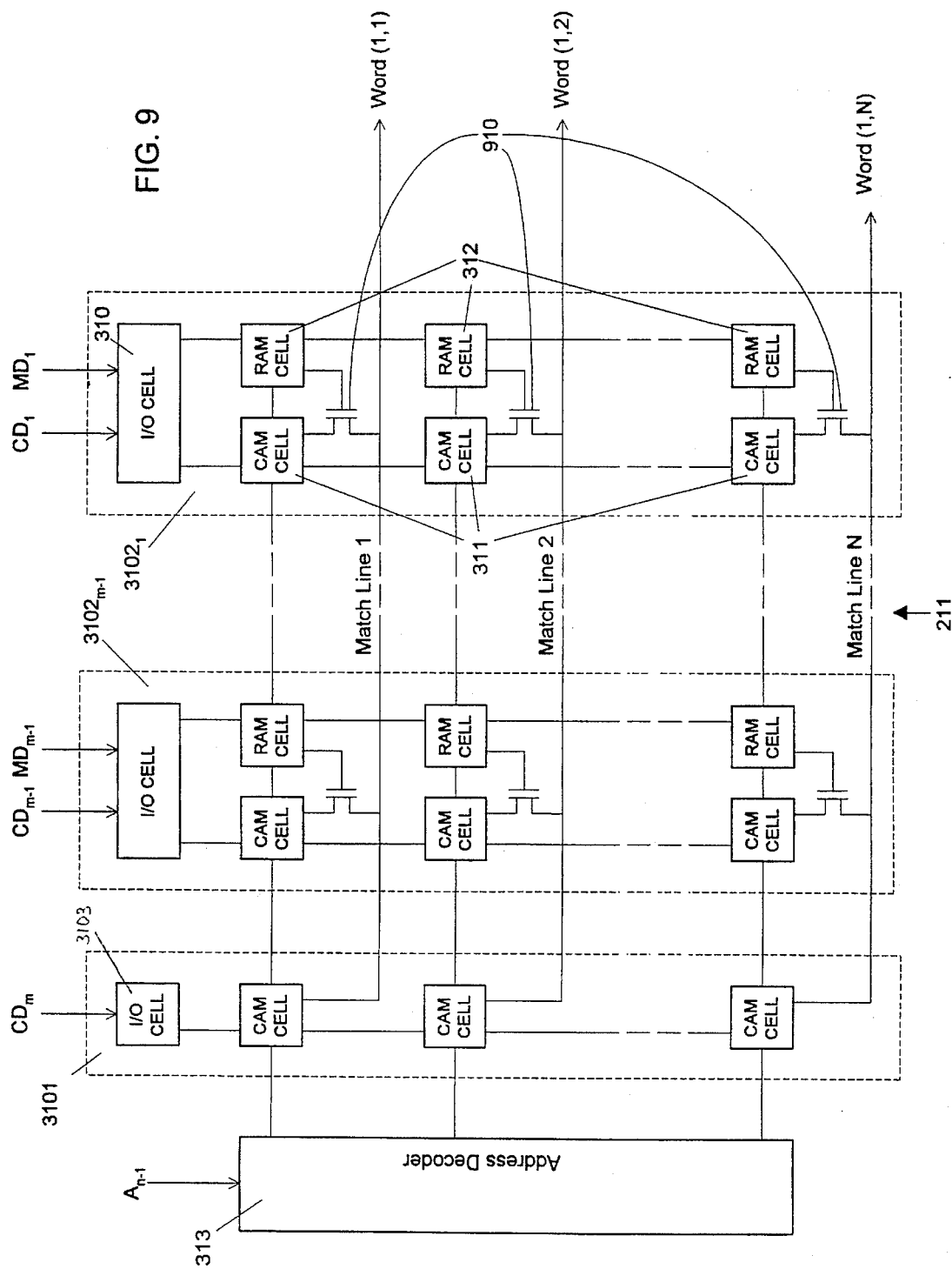
FIG. 9 is a schematic diagram of a collator used in the high speed associative memory of the present invention.

An example of the structure and the function of a collator 211 will now be described referring to FIG. 9. FIG. 9 is a schematic diagram of collator 211 in the 1st memory module $2100_1$. Collator 211 includes I/O cells for receiving input data bits $CD_m$ through $CD_1$ and mask data bits $MD_{m-1}$ through $MD_1$. Except for input data bit $CD_m$ each input data bit $CD_{m-1}$ through $MD_1$ is processed with a corresponding mask data bit $MD_{m-1}$ through $MD_1$ in a corresponding one of sections $3102_{m-1}$ through $3102_1$. Each of the sections $3102_{m-1}$ through $3102_1$ includes N sets of CAM cells 311 for storing input data bits and RAM cells 312 for storing mask data bits. Input data bits $CD_m$ are stored in section 3101, which includes only N CAM cells 311. Thus, I/O cell 3103 of section 3101 differs from an I/O cell 310 by not having an input and an output for a mask data bit. The structure and the function of the cache memory collator 213 can be substantially identical to those of the collator 211. The collator 211 comprises I/O cells 310, which are horizontally aligned in FIG. 9, content addressable memory (CAM) cells 311 and RAM cells 312, which are disposed in a matrix in FIG. 9, and an address decoder 313. In this example, the number of each cell horizontally aligned is required to be identical to the number of the bit width of the input data CD. The input data 215 having a bit width of m are herein identified as the input data ($CD_1$ through $CD_m$), and the mask patterns 216 having a bit width of m−1 are identified as the mask data ($MD_1$ through $MD_{m-1}$), The input data ($CD_1$ through $CD_m$) and the mask data ($MD_1$ through $MD_{m-1}$) are input to a row of the plural I/O cells 310 and 3103 in parallel. Collator 211 stores N words, identified as Word (1,l) through Word (1,N) for the first, leftmost memory module.

The input data ($CD_1$ through $CD_m$) input to the I/O cell 310 are collated with the data (Word(1,1) through Word(1, N)) with a bit width of m stored in the memory cell. More specifically, the selected bit portions of the m bit input data ($CD_1$ through $CD_m$) which are not masked with the mask patterns ($MD_1$ through $MD_{m-1}$) are collated with the corresponding bit portions of the m bit data (Word(1,1) through Word(1,N) ). As a result, one or more m bit data (one or more Words) including the unmasked bit portions of the input data ($CD_1$ through $CD_m$ ) is detected. In accordance with the detection, a collating register (not shown) is flagged.

The collation in the collator 211 will now be described in more detail. In the collator 211 of the associative memory of this example, since the input data ($CD_1$ through $CD_m$) are simultaneously collated with N data (Word(1,1) through Word(1,N)), N CAM cells 311 and N RAM cells 312 are vertically disposed. In other words, M×N CAM cells 311 are disposed in each collator 211.

Figure 10:
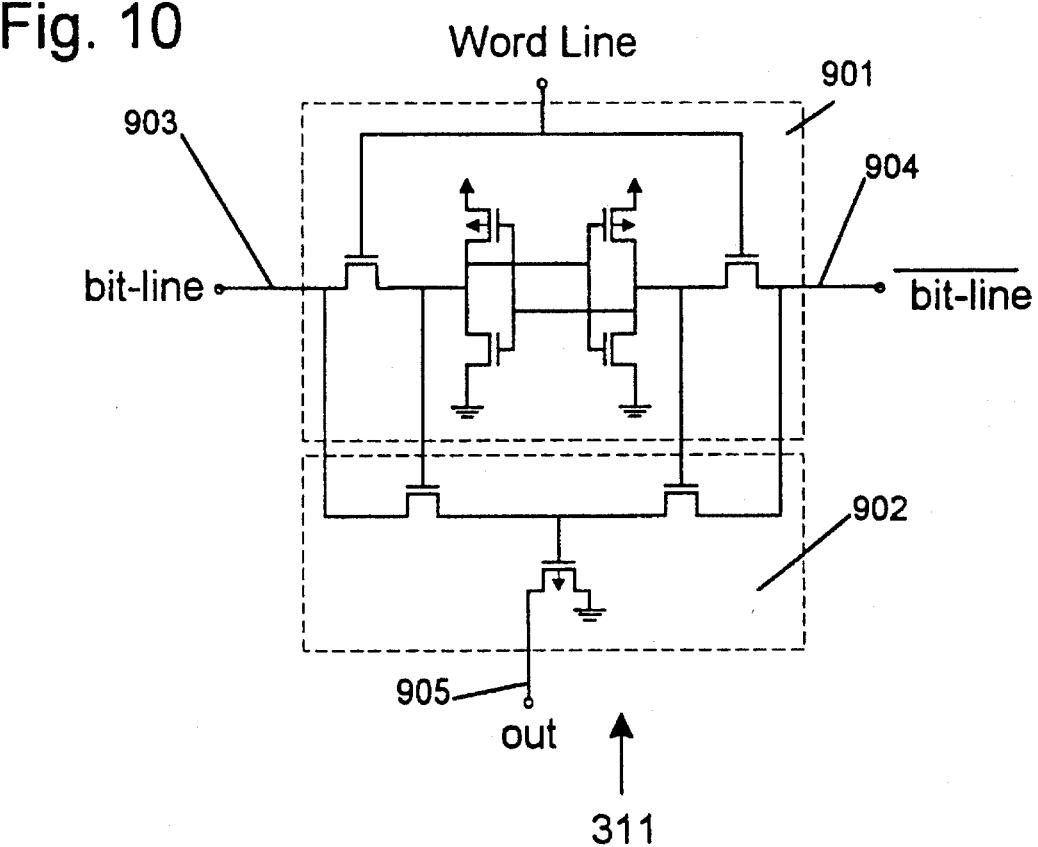
FIG. 10 is a schematic diagram of a CAM cell used in the high speed associative memory of the present invention.

FIG. 10 shows a structural example of a CAM cell 311. The CAM cell 311 is formed from an ordinary SRAM 901 and three matching logical transistors 902, and includes an exclusive (EX) OR circuit. The SRAM 901 stores data 1 or data 0 depending upon each bit of the Word(1,1) through Word(1,N) to be stored.

One of the piece of input data ($CD_1$ through $CD_m$), for example, an input data $CD_i$ is input to a CAM cell 311 through a bit line pair (a bit line 903 and a bit-line 904) from the corresponding I/O cell 310. The matching logical transistors 902 detect whether or not the data stored in the SRAM 901 (1 or 0) matches the input data $CD_i$ (1 or 0). When the data in the SRAM 901 matches the input data $CD_i$, the output terminal 905 (OUT) of the CAM cell 311 becomes of high impedance. When they do not match, the output terminal 905 (OUT) of the CAM cell 311 outputs 0 (logic low level).

The output terminal (OUT) of the CAM cell 311 is connected to a match line through a MOS transistor 910 such as that shown in FIG. 9. In the following description, it is assumed that a plurality of MOS transistors 910 of sections $3102_1$ through $3102_{m-1}$ directly connected to same match line are all conductive. In such a case, when the output terminal 905 of any of the CAM cells 311 connected to the match line is in the low level, the match line becomes low level. When the output portions of all the CAM cells 311 connected to the match line are in high impedance, the match line becomes high impedance. Therefore, it is possible to detect the matching of the data in the CAM cell 311 connected to the match line by detecting whether or not the match line is in high impedance.

Next, it is assumed that the MOS transistors 910 in FIG. 9 are not conductive. In this case, the electrical connection between the output terminal 905 (OUT) of the CAM cell 311 and the corresponding match line is cut. As a result, when the data stored in the SRAM 901 does not match the input data, such a mismatch does not affect the match line. The MOS transistors 910 are controlled to be conductive or nonconductive based on the mask data ($MD_1$ through $MD_{m-1}$) as described below.

For example, the data Word(1,1) can be collated with the input data ($CD_1$ through $CD_m$) simultaneously in all the m CAM cells 311 storing the m bit data Word(1,1). The result of the collation is obtained by detecting a flag which is set in accordance with the potential of the match line.

A row of the m−1 RAM cells 312 store data in accordance with the mask patterns ($MD_1$ through $MD_{m-1}$) input to the I/O cells 310. The output of each RAM cell 312 is connected to the gate of the MOS transistor provided between the corresponding CAM cell and the match line, and controls the electrical conductivity of the MOS transistor. More specifically, the RAM cell 312 controls the electrical connection and non-connection between the output terminal (OUT) of the corresponding CAM cell and the match line in accordance with the stored data (1 or 0). For example, when a mask pattern $MD_i$ is 0, the ith RAM cell 312 from the right in FIG. 9 electrically connects the output terminal (OUT) of the corresponding CAM cell 311 with the match line via the corresponding MOS transistor. When the mask pattern $MD_i$ is 1, it electrically disconnects the output terminal (out) of the corresponding CAM cell 311 from the match line.

The address decoder 313 is connected to word lines of the CAM cells 311 and the RAM cells 312. The address decoder 313 decodes the addresses $A_1$ to $A_n$ of the data (Word(1,1) through Word(1,N)) to be collated when the data is transferred to the CAM cell 311 from the memory cell array 210. The input data CD and the mask patterns MD which are temporally stored in the I/O cells 310 are transferred into the selected CAM cells 311 and RAM cells 312 from the I/O cells 310 through the corresponding bit line pair. The selection of the CAM cells 311 and RAM cells 312 is carried out by activating a word line which is connected to the CAM cells 311 and RAM cells 312 with the address decoder 313.

Figure 11:
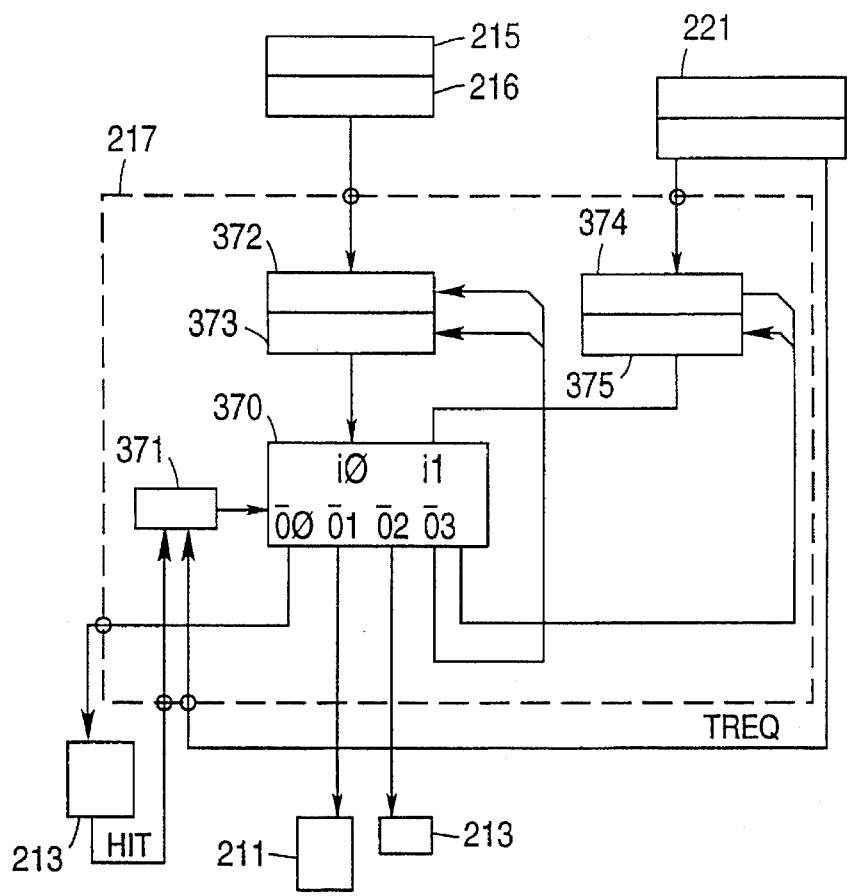
FIG. 11 is a schematic diagram of a cache controller used in the high speed associative memory of the present invention.

An example of the structure and the function of the cache controller 217 will now be described referring to FIG. 11.

After outputting the input data 215 to the cache memory collator 213, the cache controller 217 receives a cache hit signal (hereinafter referred to as the "hit signal") from the cache memory collator 213 at a mode register 371. The hit signal indicates whether or not the associative contents are stored in the cache memory 214. When the associative contents are stored in the cache memory 214 (i.e., at the time of cache hit), a multiplexer 370 processes The next input data in accordance with the output of the mode register 371. The mode register 371 also receives a data transfer request signal (hereinafter referred to as the "TREQ signal") from a prediction controller 221 to control the operation of the multiplexer 370. The function for data transfer will be described below.

At the time of cache hit, the match of the data can be detected simultaneously in all the collators 213. Therefore, the data can be read out at a high speed of, for example, 20 ns by using the SRAM in the cache memory 214. At the time of a miss hit, however, the read out time is lower because the associative contents are read out from the memory cell array 210. For example, when an inexpensive ROM with a large capacity is used in the memory cell array, the data is read out at a rate of approximately 150 ns. In the associative memory of this example, not only at the time of a miss hit but also when the cache hit ratio becomes low, the data contents in the cache memory 214 are updated, thereby improving the cache hit ratio.

The structure for the data update will now be described in detail.

Figure 12:
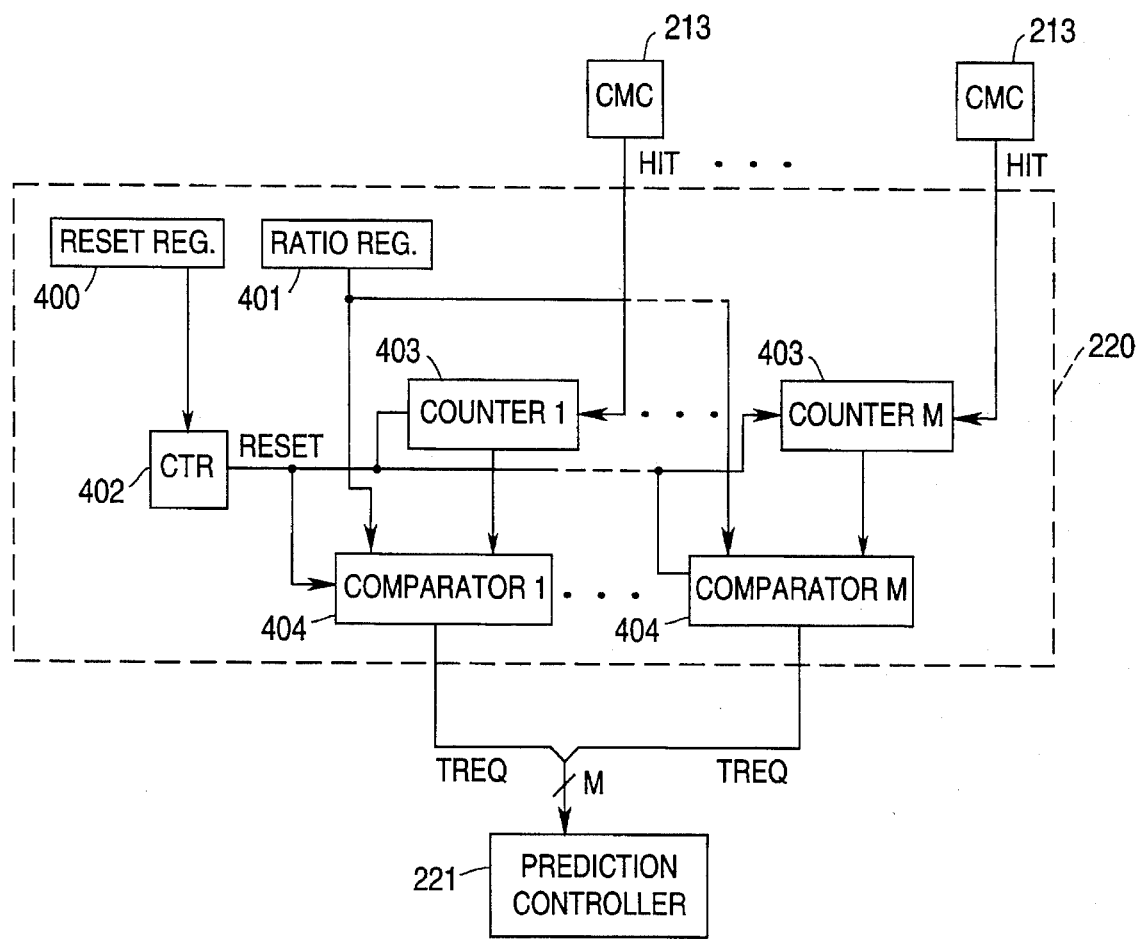
FIG. 12 is a schematic diagram of a hit ratio counter used in the high speed associative memory of the present invention.

As shown in FIG. 8, the associative memory of this example comprises a hit ratio counter 220 for obtaining an average cache hit ratio. FIG. 12 exemplifies the structure of the hit ratio counter 220. The average cache hit ratio herein is an average (in the past several cycles) of the ratio at which the associative contents of the input data CD are found in the cache memory 214. The hit ratio counter 220 comprises counters 403 for counting up hit signals sent from the cache memory collator 213 as shown in FIG. 12. Although only two counters 403 are shown in FIG. 12 for simplification, the number of the counters used in this example is sixteen. The sixteen counters 403 count hit signals in the sixteen memory modules, respectively. As initialization, a reset register 400 and a hit ratio register 401 are settled at Ti and Ht, respectively, wherein the output value Ht of the hit ratio register 401 is compared with the output of each counter 403 every Ti cycles.

The average hit ratio is obtained as follows: The counter 403 counts down from the starting value of the reset register 400 every time the data CD is input. A comparator 404 compares the output value of the counter 403 with the value of the hit ratio register 401 simultaneously with the reset output of a counter 402. When the output value of the counter 403 is taken as Hc, the comparator 404 outputs a TREQ signal=1 to the prediction controller 221 when Ht≧Hc, and outputs a TREQ signal=0 when Ht<Hc. For example, when Ht and Ti are 40 and 50, respectively, the comparator 404 outputs a TREQ signal to the prediction controller 221 when the hit ratio is 40/50, i.e., 80%, or less. The hit ratio can be optionally selected by setting Ht and Ti at desired values. Since the number of the comparators 404 is identical to that of the memory modules, i.e., M (M=16 in this example), M TREQ signals are simultaneously generated.

The associative memory of this example comprises the prediction controller 221 as shown in FIG. 8. The structure and the function of the prediction controller 221 will now be described referring to FIG. 13. When the prediction controller 221 receives a TREQ signal from the cache hit ratio counter 220, it can decide which data is transferred from the memory cell array 210 to the cache memory 214 in the memory module outputting the TREQ signal. The subsequent cache hit ratio can be improved by appropriately selecting the data to be transferred from the memory cell array 210 to the cache memory 214.

Figure 13:
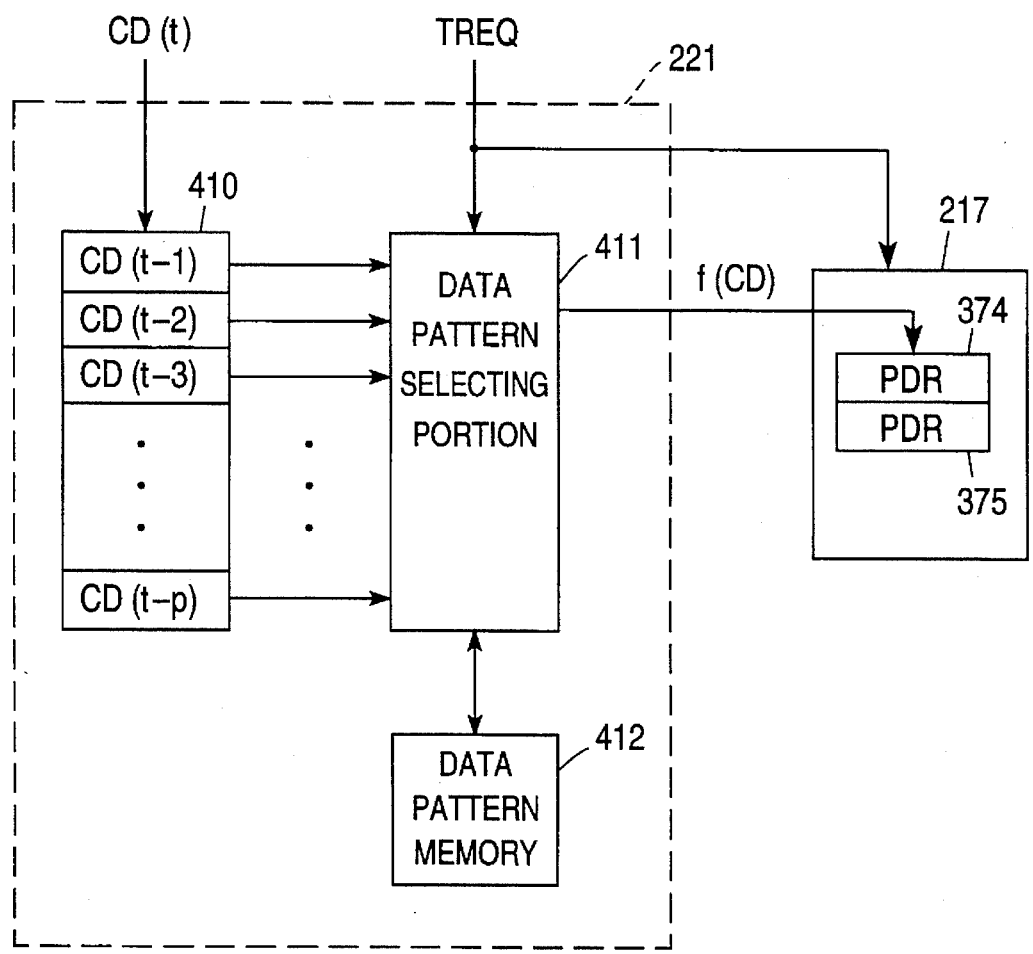
FIG. 13 is a schematic diagram of a prediction controller used in the high speed associative memory of the present invention.

The prediction controller 221 can store a plurality of input data. The prediction controller 221 comprises a shift register 410 as memory means as shown in FIG. 13. The shift register 410 can store the input data CD in the past several cycles (for example, p cycles). The input data CD in a certain cycle (i.e., at time t) is herein referred to as the input data CD(t) for simplification. The input data CD in a cycle prior to the time t by u cycle(s) is referred to as the input data CD(t-u). According to this representation, the shift register 410 can store p input data CD(t−1) through CD (t-p). Each piece of input data CD stored in the shift register 410 can be transferred in parallel to a data pattern selecting portion 411.

In accordance with the data pattern previously stored in a data pattern memory 412, the prediction controller 221 predicts in the data pattern selecting portion 411 the data f(CD) to be transferred from the memory cell array 210 to the cache memory 214. In other words, a block of data to be content-addressable based on the data f(CD) which is predicted by the prediction controller 221 is transferred from the memory cell array 210 to the cache memory 214 (block transfer).

The size of the data to be block-transferred will now be described.

The high speed associative memory of this example comprises a cache memory size setting register 222 as shown in FIG. 8. The cache memory size setting register 222 initializes the size of the memory capacity and the number of banks of the cache memory 214. For example, when the cache memory size setting register 222 is settled at 1, the cache memory 214 is used as a memory with one bank of 1K bit. When the cache memory size setting register 222 is settled at 2, the cache memory 214 is used as a memory with two banks of 512 bits each. When the cache memory size setting register 222 is settled at L, the size of the data to be transferred is 1K bit/$2^L$ banks.

The data pattern can be settled as a function of the input data CD in the past several cycles. Examples of data pattern prediction equation are shown as Equations 1 through 7 described below. The number and the kind of the prediction equations are not limited to these examples. In the data pattern prediction equations below, the data f(CD) to be obtained is represented as a function of the past input data CD. The data f(CD) is predicted by applying a desired amount of data among the stored input data CD(t) through CD(t-p) to any of the data pattern prediction equations.

Equation 1:

If $\{CD(t-1)\&CD(t-2)\&\ldots\&CD(t-p)=CD0\}=0h\}$, then $f(CD)=CD0$

Equation 2:

If $\{((CD(t-1)>>4)\&(CD(t-2)>>4)\&\ldots\&(CD(t-p)>>4)=CD0)\neq 0h\}$ then $f(CD)=CD0<<4$ wherein A>>B indicates shifting A by B bits to the right, and A<<B indicates shifting A by B bits to the left.

Equation 3:

If $\{((CD(t-1)>>8)\&(CD(t-2)>>8)\&\ldots\&(CD(t-p)>>8)=CD0)\neq 0h\}$ then $f(CD)=CD0<<8$ Equation 4:

If $\{((CD(t-1)>>12)\&(CD(t-2)>>12)\&\ldots\&(CD(t-p)>>12)=CD0)\neq 0h\}$ then $f(CD)=CD0<<12$ Equation 5:

If $\{((CD(t-1)>>16)\&(CD(t-2)>>16)\&\ldots\&(CD(t-p)>>16)=CD0)\neq 0h\}$ then $f(CD)=CD0<<16$ Equation 6:

If $\{((CD(t-1)<<4)\&(CD(t-2)<<4)\&\ldots\&(CD(t-p)<<4)=CD0)\neq 0h\}$ then $f(CD)=CD0>>4$ Equation 7:

If $\{((CD(t-1)<<8)\&(CD(t-2)<<8)\&\ldots\&(CD(t-p)<<48)=CD0)\neq 0h\}$ then $f(CD)=CD0>>8$ When the cache hit ratio is not improved by using one prediction equation, the prediction equation can be replaced with another prediction equation. The prediction controller 217 is connected to a prediction switching register 219, which can switch the prediction equation to be used among the stored prediction equations.

In this example, the data f(CD) is block-transferred from the memory cell array 210 to be stored in the cache memory 214 in this manner. When the data corresponding to the input data CD is not present in the cache memory 214, an interrupt-request generation register 218 (shown in FIG. 8) sends an interrupt-request signal to the outside, thereby transferring the data from the memory cell array 210 to the cache memory 214. The interrupt-request signal is kept on sending until the data transfer is over.

The operation of the prediction controller 221 will now be described more specifically.

It is assumed that each memory cell array 210 has 64×16K bits and each cache memory 214 has a size of 64×16 bits. In such a case, since the associative memory of this example has 16 memory modules, the total memory capacity of the associative memory is 1×16M bits.

The data CD(t) has $2^{20}$ address spaces represented from 00000h through FFFFFh (Hexadecimal). The cache memory 214 is divided into four banks by using the cache memory size setting register 222. The word number of the data to be transferred from the memory cell array 210 to the cache memory 214 (the number of the transferred words) is 16 words. The register of the prediction controller 221 can store four words, the threshold value for the cache hit ratio is 90%, and the hit ratios in the past five cycles are used to obtain an average cache hit ratio.

The following data are assumed to be input as the input data in the five cycles from the t=T-4 cycle to the t=T cycle under the above-mentioned conditions:

t=T-4: CD(t)=0FA23h t=T-3: CD(t)=0FA43h t=T-2: CD(t)=0FA1Dh t=T-1: CD(t)=0FAF7h t=T: CD(t)=0FA2Fh

It is assumed that the average cache hit ratio is below the threshold value 90% at time t=T. Then, a TREQ signal is sent from the hit ratio counter 220 to the prediction controller 221. In receiving the TREQ signal, the prediction controller 221 obtains the data f(CD)=0FA**h in accordance with Equation 1 according to the prediction switching register 219, wherein * means "do not care" and indicates the use f(MD)=FFF11h as the mask pattern. The prediction controller 221 inputs 0FA**h to the collator 211 as the input data and FFF11h as the mask pattern to the collator 221, and transfers 16 words of the collated data from the memory cell array 210 to the cache memory 214.

As described above, the cache memory 214 is divided into four banks of 16 words each. The data transferred from the memory cell array 210 is preferably written in a bank which has been most recently read out among the four banks.

In order to decide which bank has been most recently read out among the four banks in the cache memory 214, a cyclic order of the banks is useful.

Figure 14:
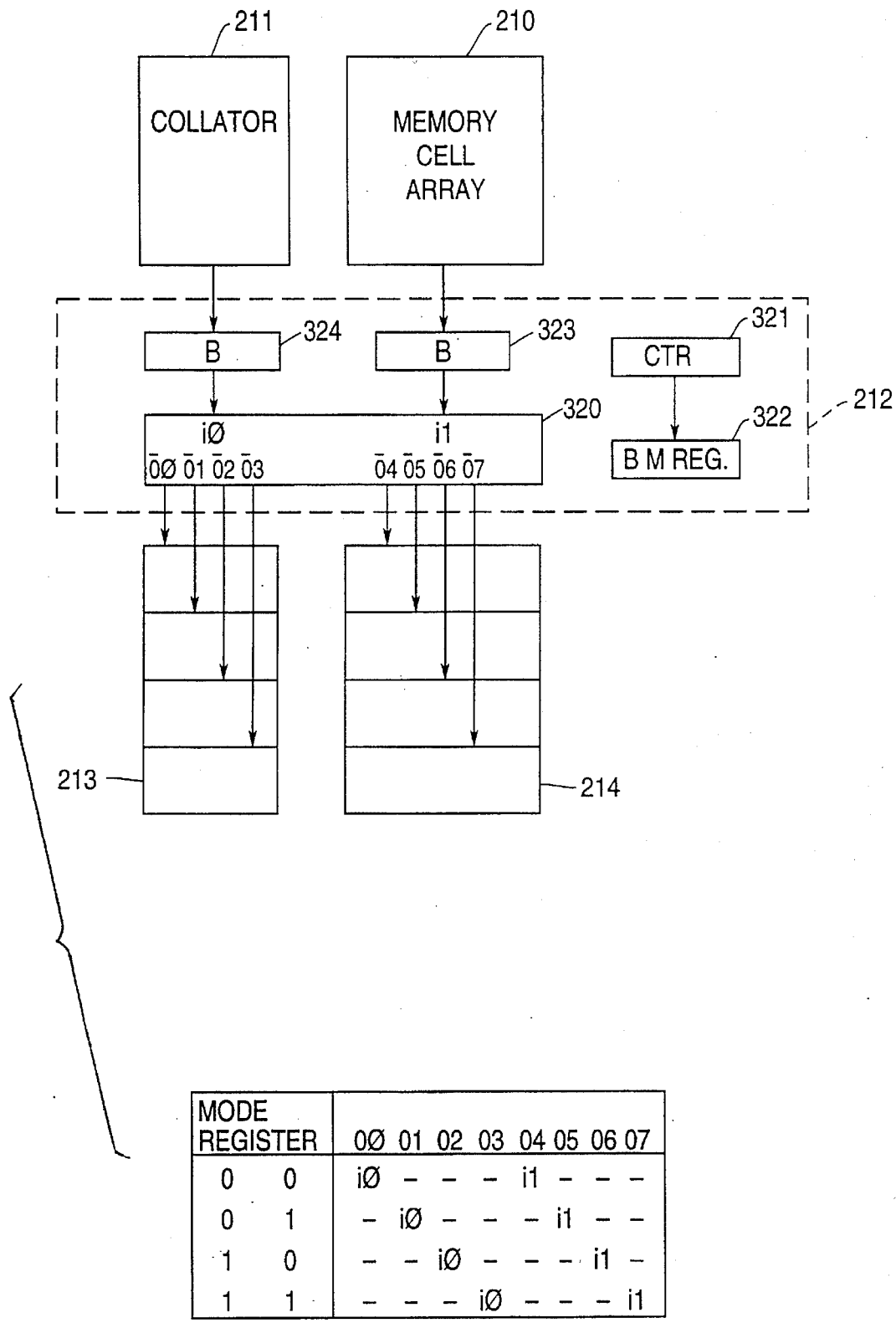
FIG. 14 is a schematic diagram of a data transfer circuit used in the high speed associative memory of the present invention.
Figure 15:
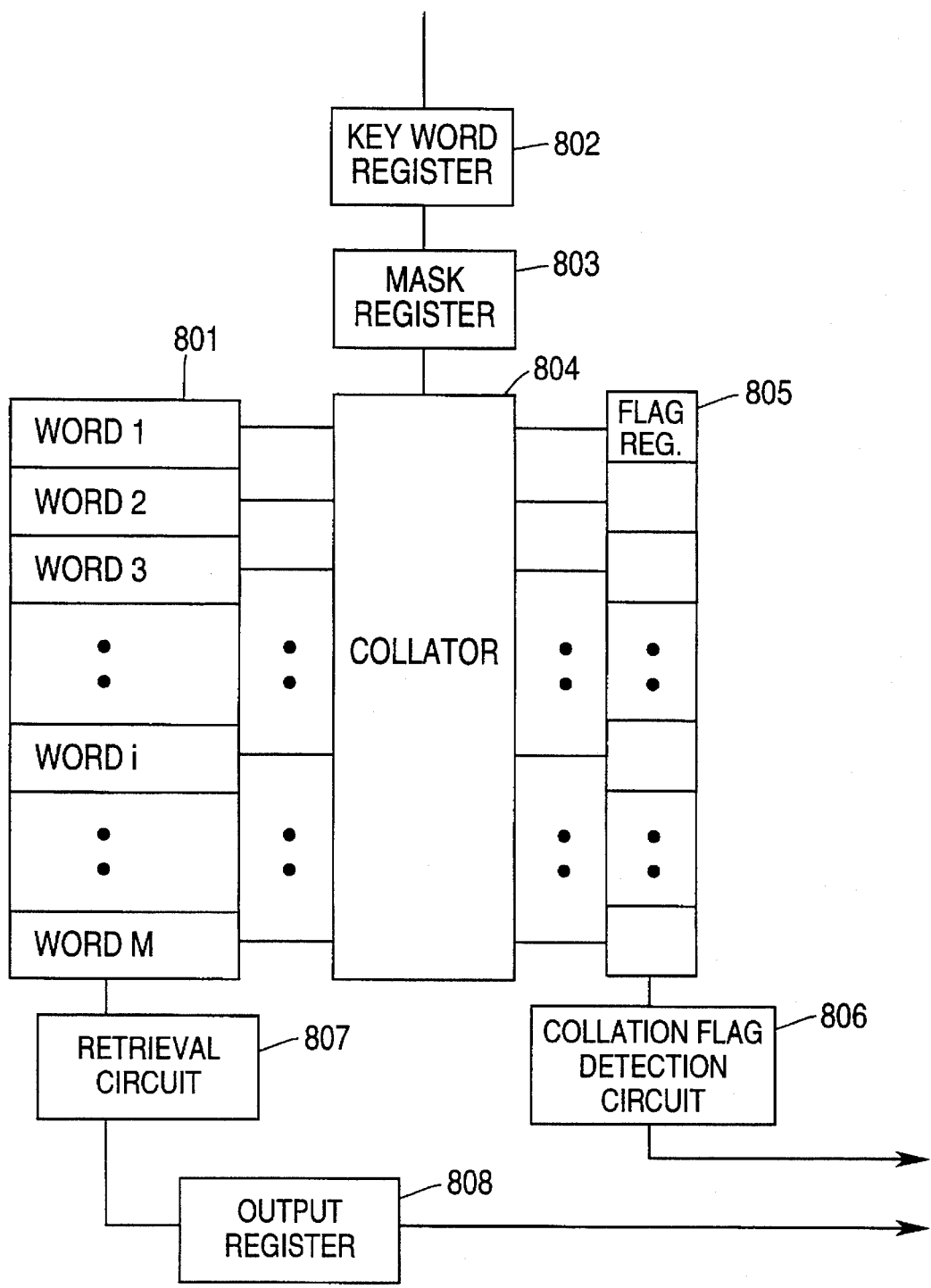
FIG. 15 is a schematic diagram of a conventional associative memory.

FIG. 14 shows an example of the structure of the data transfer circuit 212 for the cyclic check in the cache memory 214 having four banks of 16 words each. The data transfer circuit 212 comprises a counter 321 for receiving a TREQ signal from the prediction controller 221. As shown in FIG. 14, the data read out from the collator 211 and the memory cell array 210 are transferred to the cache memory collator 213 and the cache memory 214, respectively through a multiplexer 320 of the data transfer circuit 212. The data read out from the collator 211 and the memory cell array 210 are input to the buffers 324 and 323, respectively before the multiplexer 320. The data transfer circuit 212 also comprises a bank mode register 322 for specifying a bank in which the data are to be written.

The function of the data transfer of the cache controller 217 will now be described referring to FIG. 11 again. The cache controller 217 comprises predicted data registers 371, 374 and 375 for receiving a TREQ signal and the predicted data from the prediction controller 221. The predicted data registers 374 and 375 are connected to the multiplexer 370 together with input registers 372 and 373. The multiplexer 370 selectively outputs the predicted data f(CD) in the data transfer by the prediction controller 221, and selectively outputs the input data CD(t) at the time of a cache miss hit.

Referring back to FIG. 14, in the data transfer, the word(i,j) and the data in the collator 211 are transferred word by word to the buffers 323 and 324 successively from the data to be transferred. The data in the buffers 323 and 324 are written in a bank specified by the bank mode register 322 (shown in FIG. 14) of the data transfer circuit 212 among the four banks of the cache memory 214. When the capacity of the buffers 323 and 324 is one word, sixteen cycles are required to transfer sixteen words of data. When the sixteen words of data are finished to be transferred to the bank in the cache memory 214, the memory content of the bank mode register 322 is incremented by one, thereby specifying the next bank. In this manner, the cyclic check is conducted.

As is mentioned in Example 1, the data transfer rate in a memory is $1.1 \times 10^{12}$ bytes/second according to Computational Ram: A memory-SIMD Hybrid and its Application to DSP (CICC May 6, 1992 section 30.6). Therefore, the block transfer of 16 words of data (1 word=16 bits) takes $(16 \times 16)/(1.1 \times 10^{12} \times 8) = 2.9 \times 10^{-11}$ seconds in general. This is significantly smaller than the read out time of the SRAM used as the cache memory. Since the cache hit ratio is calculated in parallel with the access to the associative memory, the calculation does not affect the read out time.

The time required for the selection and the calculation of the prediction equation depends upon the prediction equation to be selected. Among the above-mentioned Equations, Equation 5 takes the longest time. A 16 bit shift operation and an AND operation are required to obtain the data f(CD).

In an ordinary semiconductor device produced by a 0.8 μm process, a shift operation and an AND operation take approximately 2 ns. Therefore, the execution of all the Equations requires approximately 14 ns (=2 ns×7). This is smaller than the read out time of the cache memory.

As described above, the high speed associative memory of this example can make the memory capacity of the cache memory significantly smaller than that of the memory cell array, resulting in a compact high speed memory. More specifically, the ratio of the memory capacity of the memory cell array 210 to that of the cache memory 214 is 1000:1 in the associative memory of this example.

The relationship between the capacity ratio of the memory cell array to the cache memory and the cache hit ratio in this example is identical to that shown in FIG. 5. The relationship between the cache hit ratio and the read out time improvement in this example is also identical to that shown in FIG. 6. The relationship between the cache hit ratio h and the data read out time tr in this example is also identical to that shown in FIG. 7.

Since the present invention realizes a significant minimization of the memory capacity of the cache memory as compared with that of the memory cell array, more compact high speed semiconductor memory and high speed associative memory can be produced. Moreover, the high speed semiconductor memory and the high speed associative memory of the present invention have a predicting and updating function for data in the cache memory, thereby decreasing the cache miss hit and increasing the cache hit ratio.

Especially, the high speed associative memory of this invention provides a function to associatively search a thesaurus rapidly. Moreover, when the high speed associative memory is used in a font dictionary, a parameter for an outline font can be rapidly searched.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A high speed semiconductor memory comprising at least one memory module and a cache controller;

the memory module including a plurality of memory cells for storing data and a cache memory for storing part of the data stored in the plurality of memory cells;

the cache controller comprising a hit ratio counter for obtaining an average cache hit ratio and a comparator for comparing an input threshold value with the average cache hit ratio, a prediction equation memory for storing a plurality of address modification prediction equations, wherein the cache controller determines whether or not data corresponding to an input address is stored in the cache memory; allows the data to be output from the cache memory when the data is stored in the cache memory; and allows the data to be read out from the plurality of memory cells to be stored in the cache memory so as to update memory contents of the cache memory; and wherein a data transfer request signal is generated for transferring the data from the memory cells to the cache memory when the average cache hit ratio is lower than the threshold value, and wherein the memory further comprises a prediction controller for receiving the data transfer request signal and determining a first address for the data to be transferred from the memory cells to the cache memory, the prediction controller including a register for storing the input addresses in past several cycles, and determining the first address of the data to be transferred from the memory cells to the cache memory based on a selected one of said plurality of address modification prediction equations and the input addresses in the past several cycles, each of the address modification prediction equations being a function of input addresses.

2. A high speed semiconductor memory according to claim 1 further comprising a cache memory size setting register for determining the size of a memory capacity and the number of banks of the cache memory.

3. A high speed semiconductor memory according to claim 1, wherein said selected one of the plurality of address modification prediction equations is replaced with another one of the plurality of address modification prediction equations, when the cache hit ratio is not increased.

4. A high speed associative memory comprising:

at least one memory module including a plurality of memory cells for storing data and a cache memory for storing part of the data stored in the plurality of memory cells;

collating means for collating a masked input data with the stored data;

a cache controller for determining whether or not data matching the masked input data is stored in the cache memory, and when the data is not stored in the cache memory, allowing the data to be read out from the plurality of memory cells to be stored in the cache memory so as to update memory contents of the cache memory;

a data pattern memory for storing a plurality of data pattern prediction equations; and a hit ratio counter for obtaining an average cache hit ratio;

the hit ratio counter comprising a comparator for comparing an input threshold value with the average cache hit ratio, wherein a data transfer request signal for transferring the data from the memory cells to the cache memory is generated when the average cache hit ratio is lower than the threshold value, and wherein the memory further comprises a prediction controller for receiving the data transfer request signal and determining the data to be transferred from the memory cells to the cache memory, the prediction controller including a register for storing the data matching the input data in past several cycles and determining the data to be transferred from the memory cells to the cache memory based upon a selected one of said plurality of data pattern prediction equations and the masked input data in the past several cycles.

5. A high speed associative memory according to claim 4 further comprising a cache memory size setting register for determining the size of a memory capacity and the number of banks of the cache memory.

6. A high speed associative memory according to claim 4, wherein the input data is masked in accordance with a mask pattern data.

* * * * *